(12) United States Patent
Kato et al.

(10) Patent No.: US 7,104,533 B2
(45) Date of Patent: Sep. 12, 2006

(54) CYLINDRICAL VIBRATION DAMPING DEVICE

(75) Inventors: Kazuhiko Kato, Komaki (JP); Junichiro Suzuki, Kasugai (JP); Naoki Nishi, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/718,987

(22) Filed: Nov. 21, 2003

(65) Prior Publication Data

US 2004/0108639 A1    Jun. 10, 2004

(30) Foreign Application Priority Data

Nov. 26, 2002  (JP)  ............................. 2002-343097
Dec. 27, 2002  (JP)  ............................. 2002-382624
Jan. 31, 2003  (JP)  ............................. 2003-025089

(51) Int. Cl.
    *F16F 1/38*    (2006.01)
(52) U.S. Cl. ................................. 267/140.12
(58) Field of Classification Search .............................
    267/140.11–141.7, 293, 294; 248/636, 638;
    180/300, 312
    See application file for complete search history.

(56) References Cited

U.S. PATENT DOCUMENTS

| | | | | |
|---|---|---|---|---|
| 4,139,246 A | * | 2/1979 | Mikoshiba et al. | ......... 384/222 |
| 4,744,677 A | * | 5/1988 | Tanaka et al. | ............... 384/222 |
| 4,767,108 A | * | 8/1988 | Tanaka et al. | ......... 267/140.12 |
| 5,080,330 A | * | 1/1992 | Nanno | ..................... 267/140.12 |
| 5,286,014 A | * | 2/1994 | Chakko | ...................... 267/293 |
| 5,413,319 A | * | 5/1995 | Hein et al. | ............. 267/140.12 |
| 6,474,631 B1 | * | 11/2002 | Hadano et al. | ............. 267/276 |

FOREIGN PATENT DOCUMENTS

| | | |
|---|---|---|
| JP | U-58-1842 | 11/1956 |
| JP | U-2-13840 | 11/1990 |
| JP | 5-77637 | 10/1993 |
| JP | 6-54938 | 7/1994 |
| JP | 6-69469 | 9/1994 |
| JP | U-6-69469 | 9/1994 |
| JP | 2574003 | 3/1998 |
| JP | 2001-74080 | 3/2001 |
| JP | 2002-89623 | 3/2002 |

* cited by examiner

*Primary Examiner*—Christopher P. Schwartz
(74) *Attorney, Agent, or Firm*—Beyer Waever & Thomas LLP

(57) ABSTRACT

A cylindrical vibration-damping device includes: a rubber bushing having a rubber elastic body elastically connecting an inner sleeve and a resin outer sleeve; a rigid mounting member having a cylindrical bore into which the rubber bushing is press fit; an engaging stepped face formed on an inner surface of the mounting member; and an engaged stepped face produced on an outer surface of the outer sleeve once the outer sleeve is press fit into the cylindrical bore of the mounting member, by means of elastic deformation of the outer sleeve. The engaged stepped face is opposed to the engaging stepped face in an axial direction of the device, and is brought into engagement with the engaging stepped face so as to exhibit a resistance to dislodging of the rubber bushing from the mounting member in at least one of opposite axial directions. The method of producing the same is also disclosed.

10 Claims, 28 Drawing Sheets

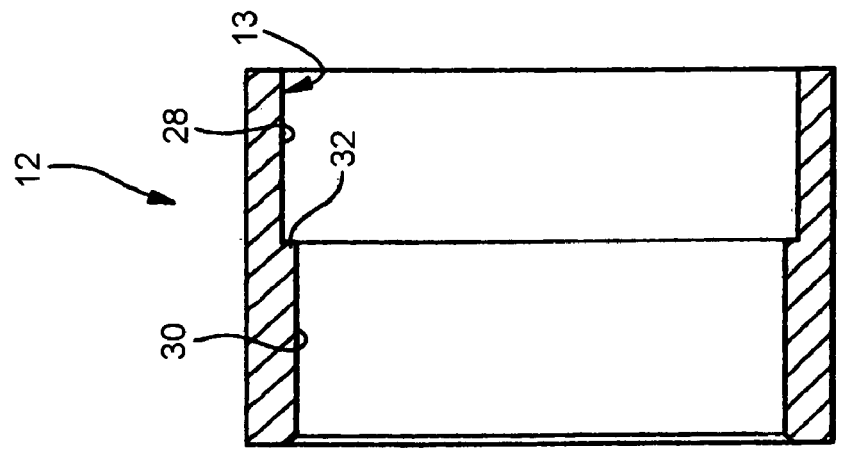
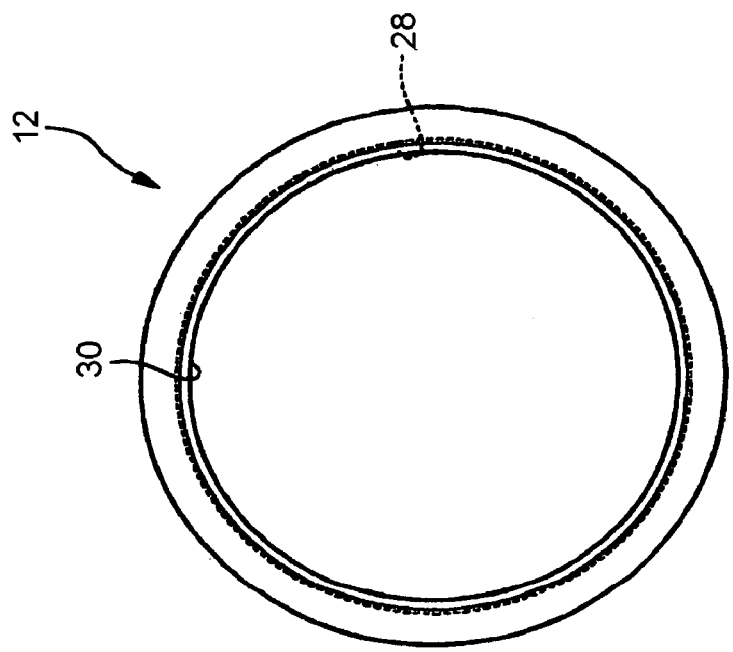

PRESENT EMBODIMENT

COMPARATIVE EXAMPLE 1

COMPARATIVE EXAMPLE 2

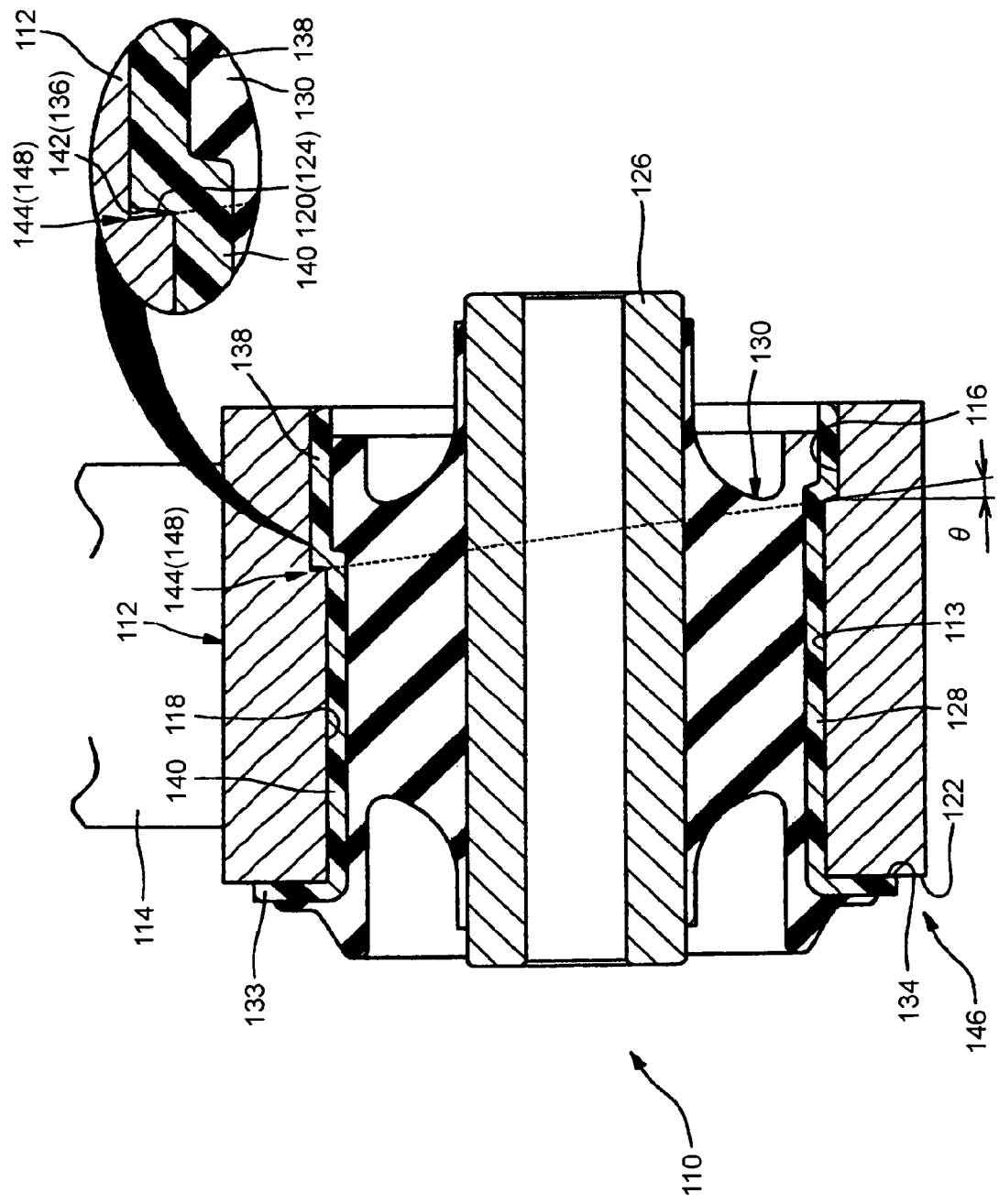

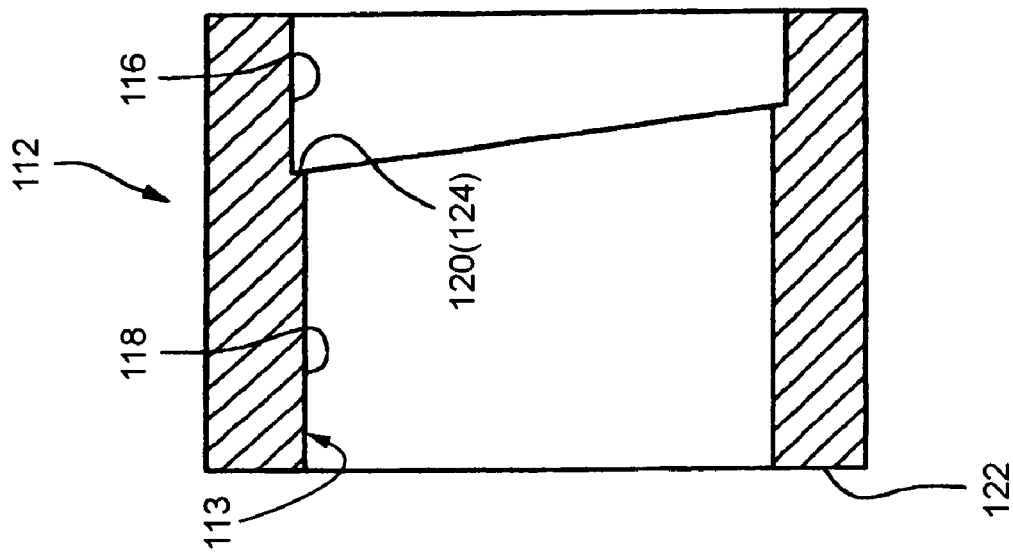
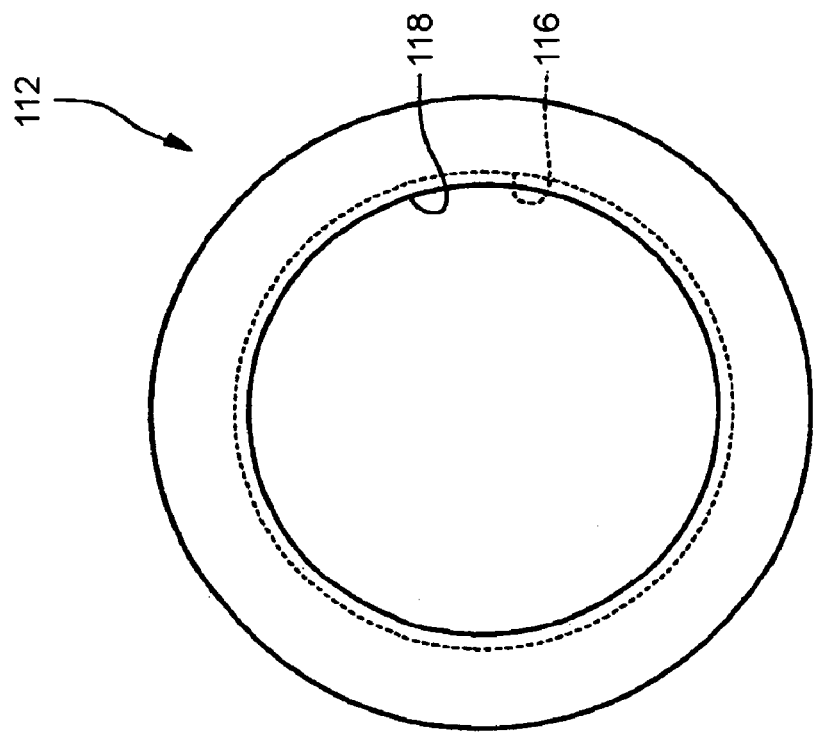

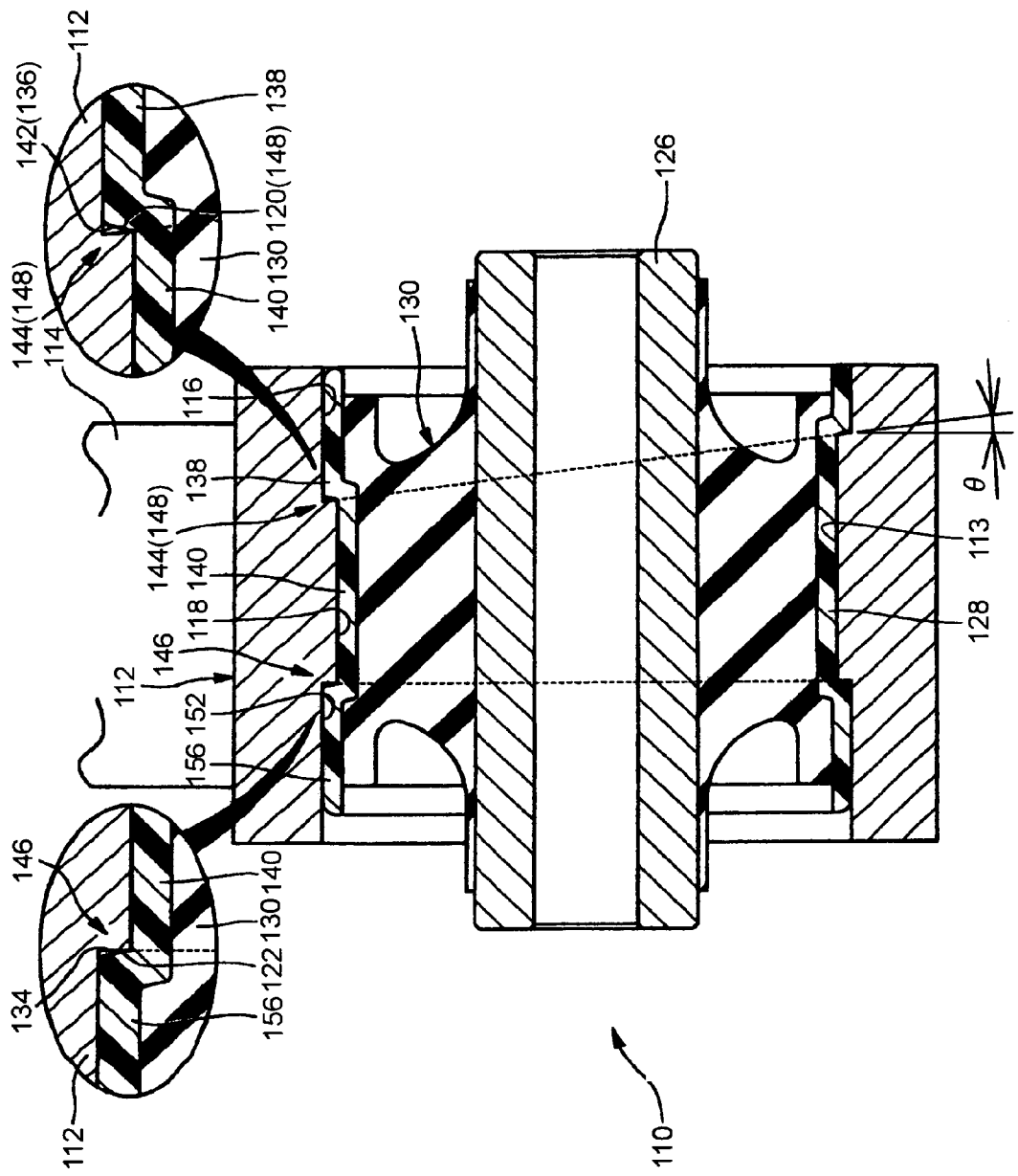

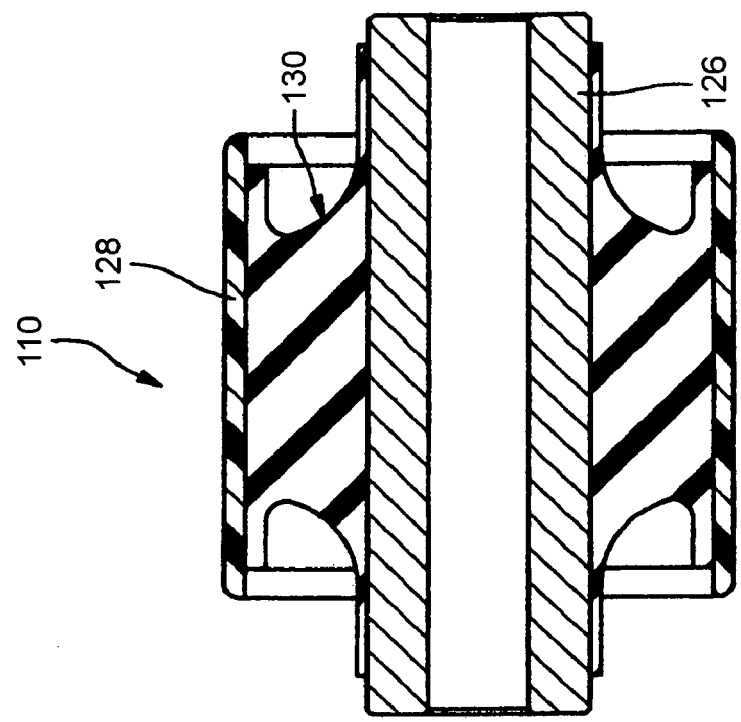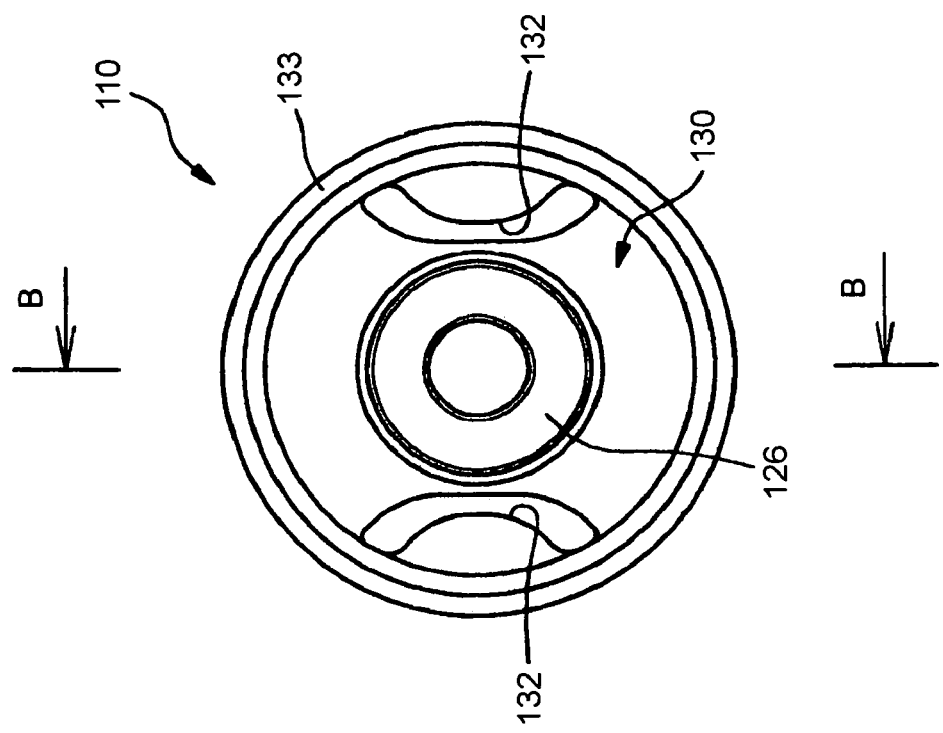

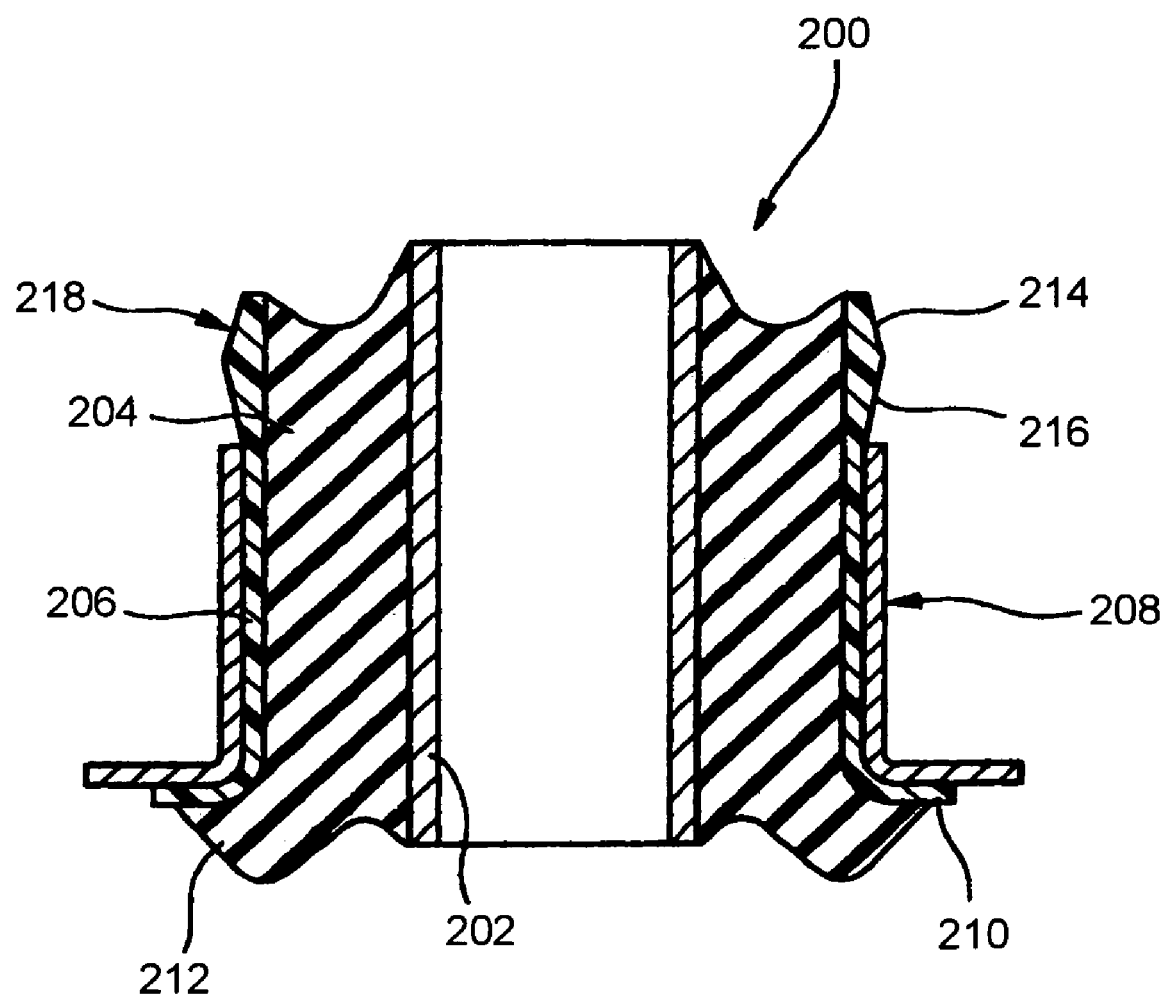

CYLINDRICAL VIBRATION DAMPING DEVICE

INCORPORATED BY REFERENCE

The disclosure of Japanese Patent Applications No. 2002-343097 filed on Nov. 26, 2002, No. 2002-382624 filed on Dec. 27, 2002 and No. 2003-025089 filed on Jan. 31, 2003, each including the specification, drawings and abstract is incorporated herein by reference in their entirety.

BACKGROUND OF THE INVENTION

1. Field of the Invention

The present invention relates to a cylindrical vibration damping device in which a rubber bushing is retained in a condition of being press fit into a mounting member of cylindrical configuration, and more particularly relates to such a device in which an outer sleeve of the rubber bushing is formed of resin.

2. Description of the Related Art

Conventionally, cylindrical vibration damping devices have been widely used as trailing arm bushings, suspension bushings including torque rod bushings, engine mounts and the like for use in automotive vehicles. A typical cylindrical vibration-damping device has a design in which a rubber bushing, which includes rigid inner and outer sleeves elastically connected together via a rubber elastic body interposed therebetween, is held in press-fit fashion within a cylindrical bore of a mounting member, with an outer surface of the outer sleeve held in contact with an inner surface of the cylindrical mounting bore of the mounting member.

In a cylindrical vibration damping device of this kind, the outer sleeve, inner sleeve and mounting member of the rubber bushing are all made of metal. The outer sleeve of the rubber bushing is press fit into the cylindrical bore of the mounting member with a predetermined tightening allowance. This arrangement generates strong frictional force between the outer surface of the outer sleeve and the inner surface of the cylindrical bore of the mounting member, thus preventing undesirable dislodging of the rubber bushing from the mounting member.

Recently, fabricating the rubber bushing outer sleeve from resin has been considered. However, an inherent problem is that the elastic recovery force of a resin outer sleeve is depressed by means of stress relaxation, and when subjected to the effects of heat, even greater stress relaxation can be produced. Despite the predetermined tightening allowance during initial press fitting, changes over time result in depressed elastic recovery force of the outer sleeve vis-a-vis the mounting member, so that resistance to dislodging declines.

An exemplary countermeasure for this problem is disclosed in Reference 1 given hereinbelow. FIG. 28 shows a specific example, wherein 200 is a rubber bushing having a metal inner sleeve 202, a rubber elastic body 204 integrally disposed onto an outer surface of the inner sleeve 202, and a resin outer sleeve 206 integrally disposed onto an outer surface of the elastic body 204. 208 is a metal mounting member of cylindrical shape. The rubber bushing 200 is press fit into a bore of this mounting member 208 and retained fitting therein.

The resin outer sleeve 206 has a flange portion 210 at an axial end (the lower end as viewed in FIG. 28). This flange portion 210, by abutting the axial end face of the mounting member 208, prevents the rubber bushing 200 from dislodging in the upward direction in FIG. 28. The outer sleeve 206 has a partially thick-walled engaging portion 218, on the axial end thereof opposite from this flange portion 210 and projecting out in the axial direction from the mounting member 208. The partially thick-walled engaging portion 218 has sloping faces 214, 216 that incline in mutually opposite directions. Once the rubber bushing 200 has been press fit into the mounting member 208, the rubber bushing 200 is prevented from dislodging from the mounting member 208 in the downward direction in FIG. 28, by means of this engaging portion 218 becoming engaged with an axial end face of the mounting member 208, specifically, the axial end face on the opposite end from the flange portion 210.

[Reference 1]

JP-U-5-77637

However, the device taught in Reference 1, or shown in FIG. 11, has no specific provision for preventing rotation of the rubber bushing 200 relative to the mounting member 208, and if the resin outer sleeve 206 of the rubber bushing 200 that has been press fit into the mounting member 208 experiences depressed elastic recovery force due to stress relaxation, resulting in a likelihood of rotation of the rubber bushing 200 relative to the mounting member 208.

The cylindrical vibration damping device shown in FIG. 28 has the additional drawback that a portion of the outer sleeve 206, i.e., the area of the engaging portion 218, projects out in the axial direction from the mounting member 208 and lies exposed to the outside or the atmosphere. This makes it susceptible to deterioration. Another problem is that the portion lying exposed outside and projecting out from the mounting member 208 is susceptible to being struck by a flying pebble or the like and cracked.

A further problem with this cylindrical vibration damping device is that the axial length of the rubber bushing 200, specifically, the axial length of the portion excluding the flange portion 210, must be larger than that of the mounting member 208, and is therefore subject to limitations regarding shape.

SUMMARY OF THE INVENTION

It is therefore one object of this invention to provide a cylindrical vibration damping device capable of exhibiting high resistance to dislodging of a rubber bushing from a mounting member with high stability.

It is another problem of this invention to provide a method suitable for manufacturing the cylindrical vibration damping device of this invention.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. Every elements adopted in these modes may be adoptable in any other possible combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A cylindrical vibration-damping device comprising: a rubber bushing including an inner sleeve, a resin outer sleeve disposed about the inner sleeve, and a rubber elastic body interposed between and elastically connecting the inner and outer sleeves; a rigid mounting member having a cylindrical bore into which the rubber bushing is press fit; at least one engaging stepped face formed on an inner surface of the mounting member; and at least one engaged stepped face produced on an outer surface of the outer sleeve once the outer sleeve is press fit into the cylindrical bore of the mounting member, by means of elastic deformation of the outer sleeve, the at least one engaged stepped face being opposed to the at least one engaging stepped face in an axial direction of the device, and being brought into engagement with the at least one engaging stepped face so as to exhibit a resistance to dislodging of the rubber bushing from the mounting member in at least one of opposite axial directions.

According to this mode (1) of the invention, the cylindrical bore of the mounting member has the stepped inner surface configuration, and the outer sleeve deforms by means of its elasticity to the stepped configuration conforming to the inner surface of the cylindrical bore of the mounting member 12, once the outer sleeve being press fit into the bore of the mounting member. Thus, at least one engaging stepped face formed on the inner surface of the mounting member and at least one engaged stepped face produced on the outer surface of the outer sleeve are brought into engagement with each other. This mutual engagement of the engaging and engaged stepped portions effectively enhance resistance to dislodging of the rubber bushing from the mounting member in at least one of opposite axial directions of the cylindrical vibration damping device, thereby effectively preventing undesirable dislodging of the rubber bushing from the mounting member.

According to this mode (1), the dislodging resistance force is produced by means of engagement of the engaging stepped face formed on the inner surface of the mounting member and the engaged stepped face produced on the outer surface of the outer sleeve. This arrangement eliminates a need for an engaging portion projecting out in the axial direction from the mounting member, which is employed in the conventional device as shown in FIG. 28, thus eliminating the conventional problems of degradation of the engaging portion lying exposed to the outside and cracking of the engaging portion as a result of the engaging portion being struck by a flying peddle or the like.

The aforesaid arrangement of the present mode permits that the outer sleeve is housed within the cylindrical bore of the mounting member over a substantially entire axial length thereof. Therefore, the cylindrical vibration damping device is free from limitations regarding its shape due to necessity of the long rubber bushing relative to the mounting member, and makes it possible to prevent the outer sleeve from being damaged due to its exposure to the outside. Meant by "the substantially entire axial length" of the mounting member is an axial length of the mounting member, besides a flange portion if provided.

It should be appreciated that at least one engaging stepped face may be formed at a boundary between a recessed portion formed onto the inner surface of the mounting member so as to be recessed diametrically outward and a non-recessed portion of the inner surface of the mounting member. The at least one engaging stepped face may extend in a circumferential direction of the cylindrical bore of the mounting member by a suitable circumferential length including an entire circumference of the mounting member. The engaging stepped face may be parallel to a diametric direction perpendicular to an axial direction of the device, or alternatively is inclined by angle θ relative to the diametric direction.

(2) A cylindrical vibration damping device according to the aforementioned mode (1), wherein the at least one engaging stepped face comprises a plurality of engaging stepped faces extending in the circumferential direction and situated at respective circumferential positions spaced away from one another in the circumferential direction.

According to this mode (2), the outer surface of the outer sleeve deforms to a stepped configuration conforming to the inner surface of the mounting member once press fit into the bore of the mounting member, as viewed in the circumferential direction as well as the axial direction of the outer sleeve, thereby effectively preventing a displacement of the outer sleeve relative to the mounting member in the circumferential direction as well as the dislodging of the outer sleeve from the mounting member in the axial direction. Preferably, the plurality of engaging stepped faces of the outer sleeve are arranged in the circumferential direction at regular intervals.

(3) A cylindrical vibration damping device according to the aforementioned modes (1), wherein at least one engaging stepped face comprises a plurality of the engaging stepped faces extending in the circumferential direction and situated at respective axial positions spaced away from one another in the axial direction of the device. The provision of the plurality of engaging stepped faces at a plurality of axial positions can enhance dislodging resistance of the rubber bushing from the mounting member. Preferably, the plurality of engaging stepped faces includes a pair of engaging stepped faces facing mutually opposite axial directions. Since the pair of engaging stepped faces face opposite axial directions, the dislodging of the rubber bushing from the mounting member can be prevented in either axial direction of the device. The arrangement of this mode is effectively applicable to a cylindrical vibration-damping device of flangeless type.

(4) A cylindrical vibration damping device according to the aforementioned mode (3), wherein an axial distance between the pair of engaging stepped face varies at at least one circumferential position of the device. According to this arrangement, one engaging stepped face is at least partially inclined by a suitable angle θ relative to the diametric direction perpendicular to an axial direction of the mounting member, to thereby provide a sloped engaging stepped face functioning as an anti-rotation engaging stepped face. After being press-fit, the outer surface of the rubber bushing is deformed conforming to the inner surface configuration of the mounting member, thus producing an anti-rotation engaged stepped face on the outer surface of the rubber bushing. These anti-rotation engaging and engaged stepped faces are brought into engagement with an angle θ relative to the diametric direction, making it possible to prevent displacement of the rubber bushing relative to the mounting member in the circumferential direction of the mounting member.

(5) A cylindrical vibration damping device according to any one of the aforementioned modes (1)–(4), wherein the outer sleeve has a flange portion at one of opposite axial end thereof, the flange portion being brought into abutting contact with a corresponding axial end face of the mounting member, and the flange portion of the outer sleeve and the at least one engaging stepped face of the mounting member face mutually opposite axial directions. According to this mode, the dislodging of the rubber bushing from the mounting member is effectively prevented by means of engagement of the flange portion and the axial end face of the mounting member in one axial direction, and by means of engagement of the engaging and engaged stepped faces in the other axial direction opposite to the axial direction. Preferably, an axial distance between the engaging stepped face and the flange portion varies at least one circumferential position.

(6) A cylindrical vibration damping device according to any one of the aforementioned modes (1)–(5), further comprising: an engaging anti-rotation stepped face formed on the inner surface of the mounting member so as to be inclined by a given angle relative to a diametric direction perpendicular to the axial direction of the device; and an engaged anti-rotation stepped face produced on the outer surface of the outer sleeve once the outer sleeve is press fit into the cylindrical bore of the mounting member, by means of elastic deformation of the outer sleeve, the engaged anti-rotation stepped face being brought into engagement with the engaging anti-rotation stepped face so as to exhibit a resistance to rotation of the rubber bushing relative to the mounting member in a circumferential direction of the cylindrical bore of the mounting member. Preferably, the engaging stepped face is inclined by a given angle with respect to the diametric direction so that the engaging stepped face serves as the engaging anti-rotation stepped face as well as the engaging stepped face. It should be noted that the anti-rotation stepped face has a desired angle with respect to the diametric direction. For instance, the anti-rotation stepped face has a right angle with respect to the diametric direction, namely the anti-rotation stepped face may extends in the axial direction of the device.

(7) A cylindrical vibration damping device according to any one of the aforementioned modes (1)–(6), wherein the mounting member is composed of a plurality of segments having different inside diameters, the segments being assembled together in the axial direction of the device to define therein the cylindrical bore. This arrangement facilitates to form the engaging stepped face(s), e.g., by only assembling the assembling the plurality of segments in the axial direction, by welding, for example.

(8) A cylindrical vibration damping device comprising: a rubber bushing including an inner sleeve, a resin outer sleeve disposed about the inner sleeve, and a rubber elastic body interposed between and elastically connecting the inner and outer sleeves; and a rigid mounting member having a cylindrical bore into which the rubber bushing is press fit, wherein an inner surface of the mounting member includes an annular recessed portion formed partially in an axial direction thereof so that a first engaging stepped face is formed with an annular configuration at a boundary between the annular recessed portion and an annular non-recessed portion axially adjacent to the annular recessed portion, wherein the outer sleeve has an outside diameter larger than an inside diameter of the annular non-recessed portion of the mounting member before being press fit into the cylindrical bore of the mounting member, the outer sleeve being press fit into the cylindrical bore of the mounting member while constricting in diameter in association with elastic deformation of resin, and expanding in the outside diameter at a first portion situated facing the annular recessed portion of the mounting member by means of elastic recovery force of the resin after being press fit so that an outer surface of the outer sleeve deforms to a stepped configuration conforming to the inner surface of the cylindrical bore of the mounting member and a first engaged stepped face is produced on the outer surface of the outer sleeve with an annular configuration, and wherein the first engaging stepped face of the mounting member and the first engaged stepped face of the outer sleeve are opposite to each other in the axial direction of the device, and are brought into engagement with each other so as to provide a resistance to dislodging of the rubber bushing from the mounting member in one of opposite axial directions. The vibration-damping device of this mode can enjoy the advantages of the present invention as discussed above with respect to the modes (1)–(3). In addition to these advantages, the cylindrical vibration damping device of this mode is able to exhibit further enhanced resistance to dislodging of the rubber bushing from the mounting member with the help of the engagement of the engaging and engaged stepped faces over the entire circumference of the device.

(8) A cylindrical vibration-damping device according to the above-mentioned mode (7), wherein the first portion of the outer sleeve situated facing the annular recessed portion of the mounting member once the outer sleeve is press-fit into the cylindrical bore of the mounting member, permits an amount of elastic recovery deformation larger than that in a second portion of the outer sleeve situated facing the annular non-recessed portion so that the outer surface of the outer sleeve deforms to the stepped configuration conforming to the inner surface of the cylindrical bore of the mounting member. This arrangement allows the outer sleeve to deform to the stepped configuration conforming to the inner surface of the bore of the mounting member by means of elastic recovery deformation. Also, this arrangement permits that the outer sleeve before being press-fit into the bore of the mounting member has an axially straight outer surface configuration, thereby eliminating a conventionally experienced problem of cracking of the outer sleeve due to excess squeezing of the thick walled portion protruding diametrically outward of the outer sleeve, during the press fit thereof into the mounting member.

(9) A cylindrical vibration-damping device according to the above-mentioned mode (7) or (8), wherein a wall thickness of the outer sleeve is large at the first portion situated facing the recessed portion, and is small at the second portion situated facing the non-recessed portion, before being press-fit into the mounting member. For example, the first portion of the outer sleeve has an outside diameter larger than that of the second portion so as to have the first portion thicker that the second portion. This arrangement also facilitates the outer sleeve to deform to the stepped configuration conforming to the inner surface of the bore of the mounting member.

(10) A method of assembling a cylindrical vibration-damping device including a rubber bushing including an inner sleeve, a resin outer sleeve disposed about the inner sleeve, and a rubber elastic body interposed between and elastically connecting the inner and outer sleeves; a rigid mounting member having a cylindrical bore into which the rubber bushing is press fit; at least one engaging stepped face formed on an inner surface of the mounting member; and at least one engaged stepped face produced on an outer surface of the outer sleeve once the outer sleeve is press fit into the cylindrical bore of the mounting member, by means of elastic deformation of the outer sleeve, the at least one engaged stepped face being opposed to the at least one engaging stepped face in an axial direction of the device, and being brought into engagement with the at least one engaging stepped face so as to exhibit a resistance to dislodging of the rubber bushing from the mounting member in at least one of opposite axial directions, said method comprising the steps of: press fitting the rubber bushing into the bore of the mounting member; permitting an elastic deformation of the mounting member so that the outer sleeve is deformed to a stepped configuration conforming to the inner surface of the bore of the mounting member; and forming the engaged stepped portion on the outer surface of the outer sleeve that is brought into engagement with the engaging stepped portion.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIG. 3A is a bottom plane view of a mounting member of the cylindrical vibration-damping device of FIG. 1, and FIG. 3B is an axial cross sectional view of the mounting member of FIG. 3A;

FIG. 19 is an elevational view in axial or vertical cross section of a cylindrical vibration-damping device constructed according to a fourth embodiment of the invention;

FIG. 21A is a bottom plane view of a mounting member of the cylindrical vibration-damping device of FIG. 19, and FIG. 21B is an axial cross sectional view of the mounting member of FIG. 21A;

FIG. 23 is an elevational view in axial or vertical cross section of a cylindrical vibration-damping device constructed according to a fourth embodiment of the invention;

FIG. 24A is a bottom plane view of a rubber bushing of the cylindrical vibration-damping device of FIG. 23, and FIG. 24B is a cross sectional view of the rubber bushing, taken along line B—B of FIG. 24A;

FIG. 28 is an elevational view in axial or vertical cross section of an example of conventional cylindrical vibration damping device.

DETAILED DESCRIPTION OF PREFERRED EMBODIMENTS

Figure 1:
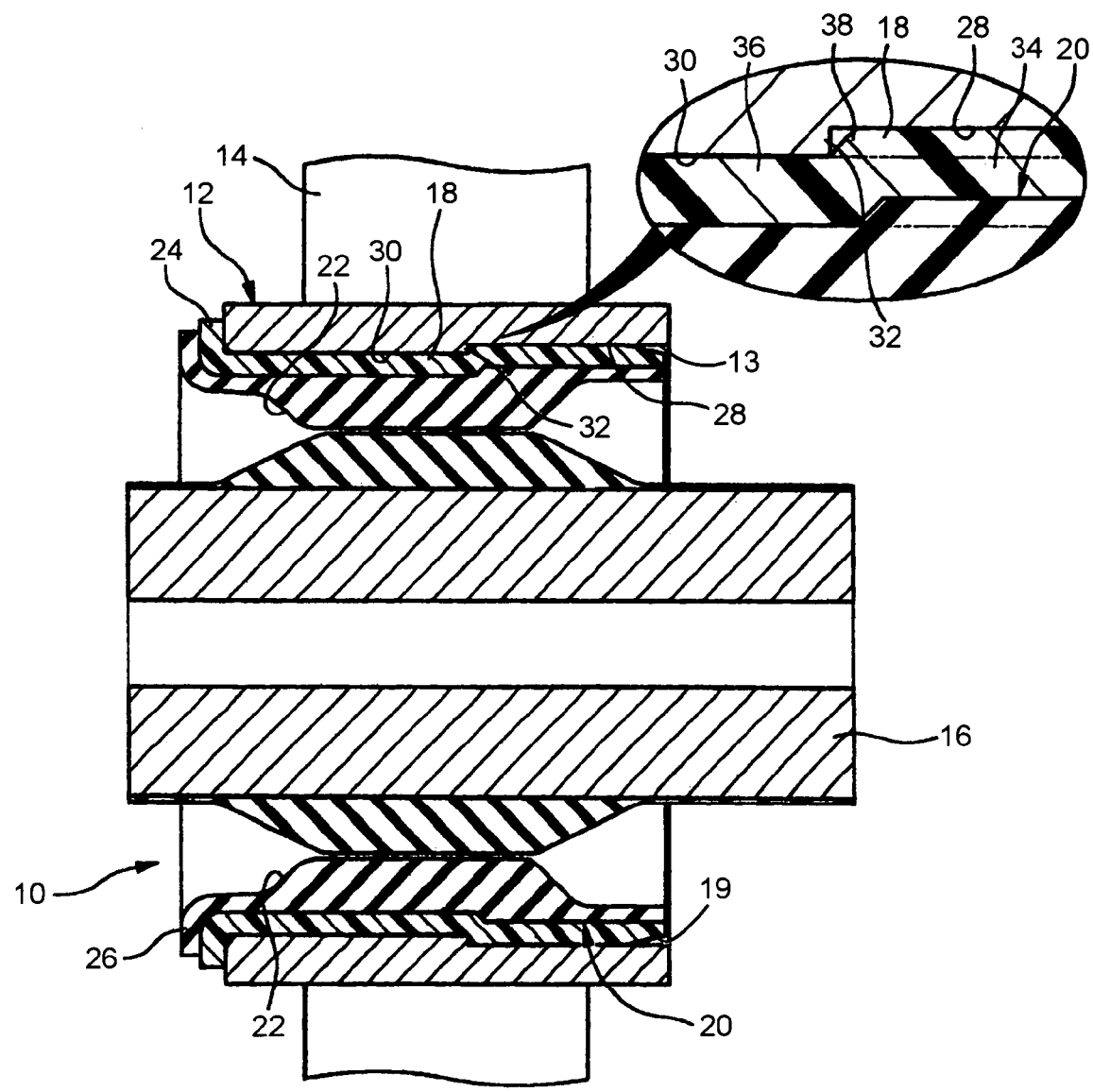
FIG. 1 is an elevational view in axial or vertical cross section of a cylindrical vibration-damping device constructed according to a first embodiment of the invention.
Figure 2B:
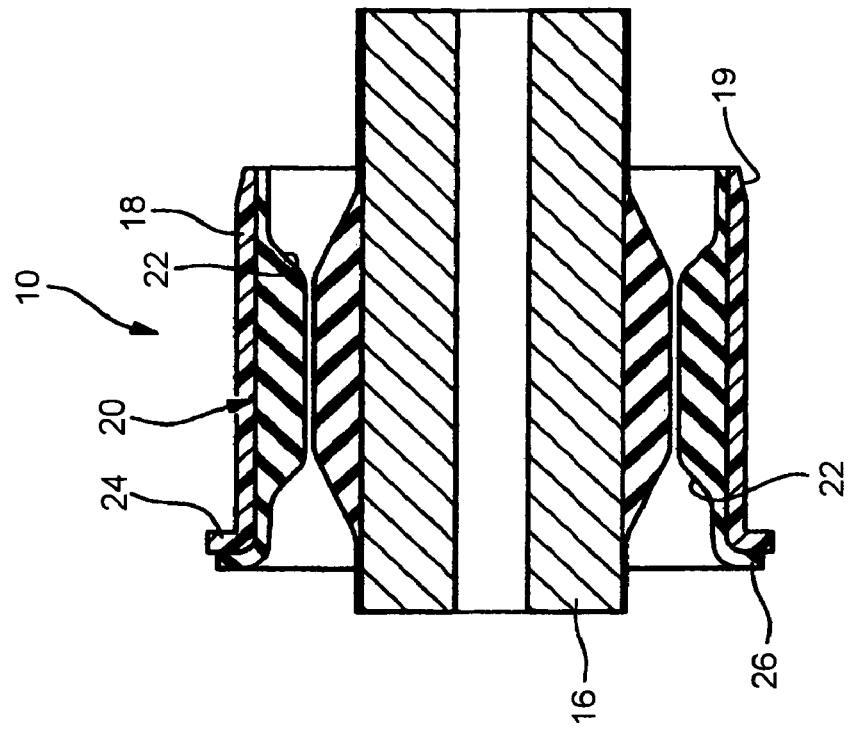
FIG. 2B is a cross sectional view of the rubber bushing, taken along line B—B of FIG. 2A.
Figure 2A:
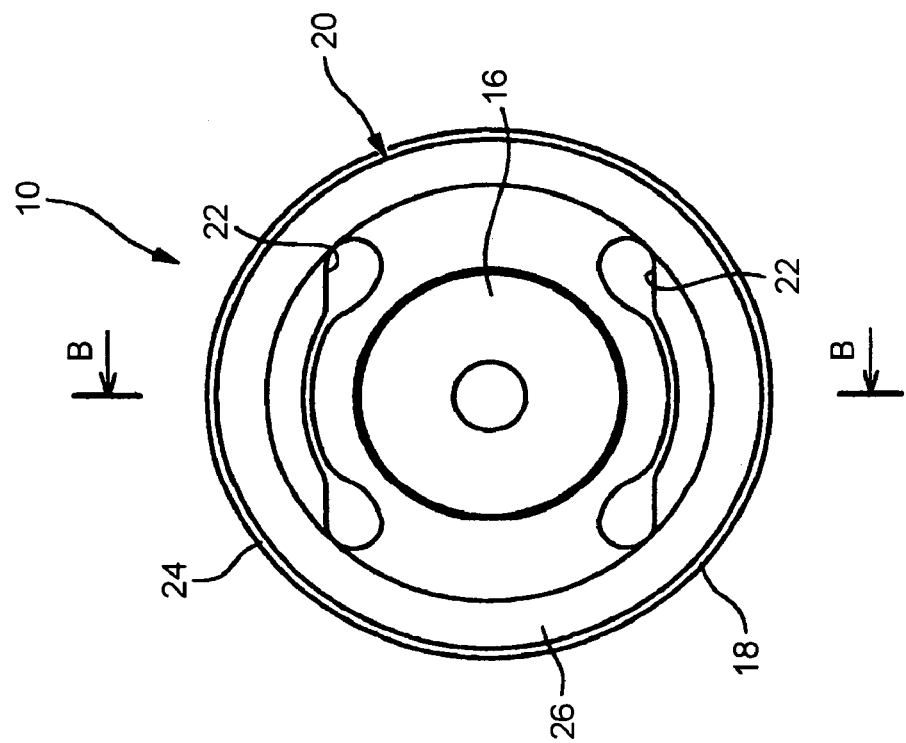
FIG. 2A is a bottom plane view of a rubber bushing of the cylindrical vibration-damping device of FIG. 1.
Figure 4:
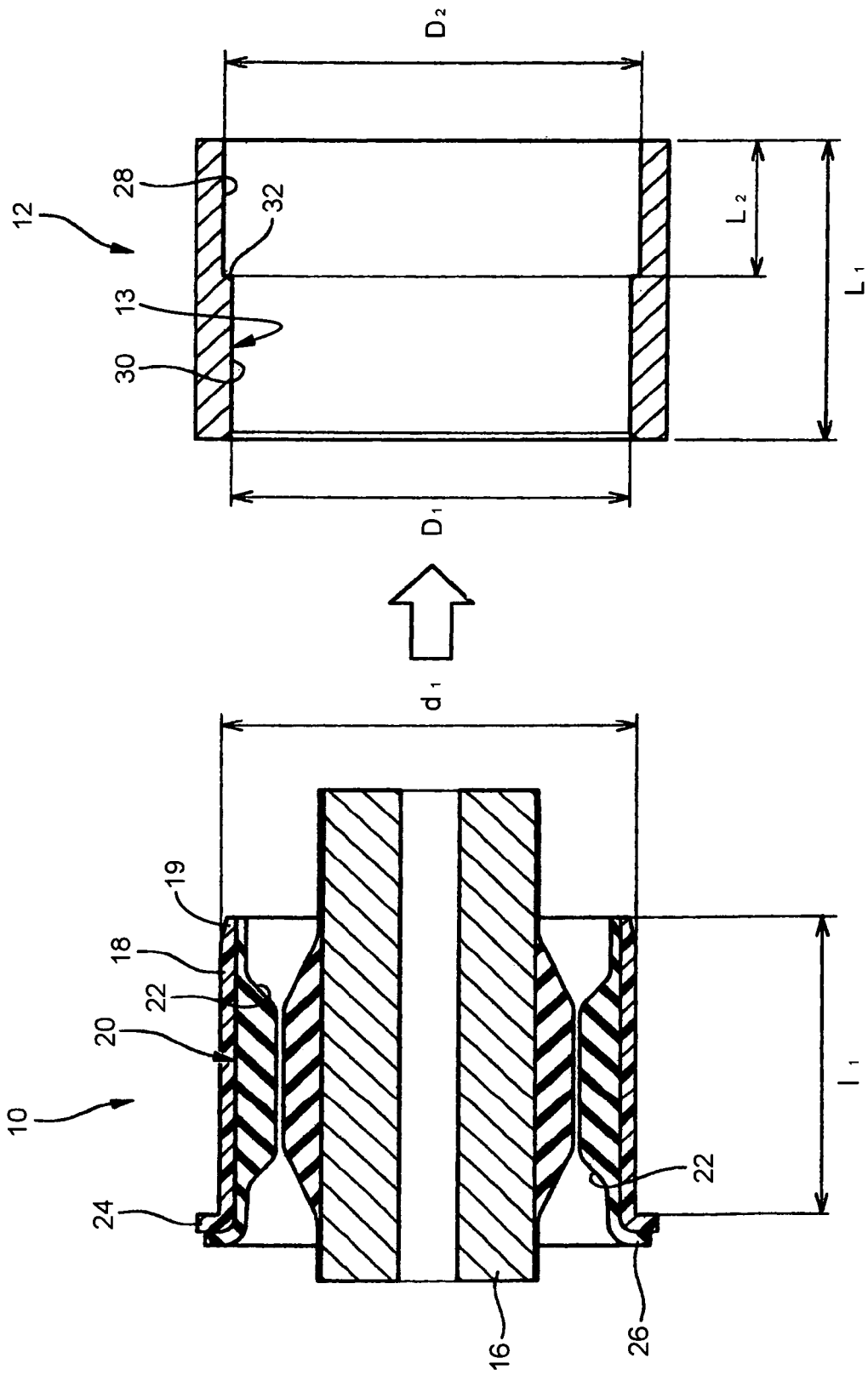
FIG. 4 is a view showing the rubber bushing and the mounting member mutually preset for their assembly, and suitable for recognizing relationships between dimensions of portions of the rubber bushing and the mounting member as well as the direction of press fitting of the rubber bushing into the mounting member.

Referring first to FIGS. 1–4, there is shown a cylindrical vibration-damping device constructed according to a first embodiment of the present invention. The present cylindrical vibration-damping device may be applied to a linking portion to link a trailing arm to a vehicle body in a torsion beam type rear suspension of an automotive vehicle. FIG. 2 shows a rubber bushing 10 of the cylindrical vibration-damping device, and FIG. 3 shows a mounting member 12 into which the rubber bushing 10 will be press fit. FIG. 1 shows the rubber bushing 10 of FIG. 2 assembled press fit into the mounting member 12 of FIG. 3. In FIG. 1, 14 denotes an arm extending out from the mounting member 12.

As shown in FIG. 2, the rubber bushing 10 has an inner sleeve 16 of cylindrical shape, an outer sleeve 18 similarly of cylindrical shape, and a rubber elastic body 20 interposed between and elastically connecting the inner and outer sleeves 16, 18. This rubber elastic body 20 is integrally bonded to the inner and outer sleeves 16, 18 through vulcanization of a rubber material for forming the rubber elastic body 20. The inner sleeve 16 is made of metal, and the outer sleeve 18 is made of resin. Alternatively, a rigid resin could be used for the inner sleeve 16. The rubber elastic body 20 has a pair of voids (gaps) 22 formed in the axial direction as shown in FIG. 2.

As shown in FIG. 2B, the outer sleeve 18 has a flange portion 24 integrally bonded to one axial end thereof (left end in FIG. 2B). Similarly, the rubber elastic body 20 has a flange portion 26 integrally bonded to corresponding axial end thereof. That is, the outer surface of the outer sleeve 18 is held in close contact with the surface of the mounting member.

Referring to FIGS. 4A and 4B, the rubber bushing 10 has an outer diameter of the outer sleeve 18, specifically, the diameter $d_1$ of the section excluding the flange portion 24, that is approximately equal to a 67 mm diameter. The axial length of the outer sleeve 18, specifically the axial length $l_1$ of the section excluding the flange portion 24 is approximately equal to the axial length $L_1$ of the mounting member 12. For facilitating the press fitting of the rubber bushing 10 into the mounting member 12, an axial end portion 19 of the outer sleeve 18 opposite the flange portion 24 has an tapered outer surface configuration.

For fabricating the outer sleeve 18, various kinds of resin may be usable. Specifically, a thermoplastic resin, heat-setting resin or the like may be used as the resin making up outer sleeve 18. Especially, the thermoplastic resins are advantageous for use owing to their excellent impact strength against input vibration and moldability into the outer sleeve 18.

Thermoplastic resin materials include polyamide (including both aromatic polyamides and modified polyamide), polyester (including modified polyester), polypropylene, polycarbonate, polyacetal, polyphenylene sulfide, modified polyphenylene ether and the like. Especially, polyamide is favorable for use owing to its strength, reinforcing effect by fillers and cost efficiency.

Fillers for compounding or blending with resin materials in order to reinforce the resin material include glass fibers, carbon fibers, aramid fibers, boron fibers, alumina fibers, metal fibers, silicon carbide fibers, glass beads, whiskers, wollastonite, kaolinite, talc, mica, and carbon nanotubes, as well as lamellar phyllosilicates composed of magnesium silicate or aluminum silicate layers, for example, montmorillonite, hectorite, vermiculite, halloysite, and the like. Especially, glass fibers are favorable for use owing to their reinforcing effect as a filler, and cost efficiency. Depending on the service location, non-reinforced resin materials that do not contain fillers may be used as well. In the present embodiment, the resin material for the outer sleeve 18 is polyamide 66 (PA66) blended with 30% glass fibers as a filler.

As shown in FIGS. 3A and 3B, the mounting member 12 has an overall cylindrical shape with a cylindrical bore 13 whose profile appropriately corresponds to that of the rubber bushing 10. The mounting member 12 is made entirely of metal. An annular recessed portion 28 is formed onto the inner surface of the mounting member 12 such that the recessed portion 28 is situated at one axial end portion (the right end in FIG. 3B), recessed diametrically outward, and extends over an approximately half axial length. A first engaging stepped face 32 is formed at the boundary between the recessed portion 28 and an non-recessed portion 30 with annular configuration.

As is apparent from FIGS. 4A and 4B, the inside diameter D2 of the recessed portion 28 is approximately equal to the outside diameter $d_1$ of the outer sleeve 18 of the rubber bushing 10 prior to being press fit. The inside diameter $D_1$ of the non-recessed portion 30, on the other hand, is smaller than the outside diameter $d_1$ of the outer sleeve 18, e.g., a 65 mm diameter. The axial length $L_2$ of the recessed portion 28 is slightly smaller than one-half the entire axial length $L_1$ of the mounting member 12. It should be noted that a dimension of $L_2$ may be modified appropriately. The mounting member of the aforementioned structure may be formed by cutting, casting or other possible known methods. When the mounting member 12 is formed of aluminum by die casting, for example, the stepped surface is finished by cutting in order to meet a desired dimensional accuracy.

In the cylindrical vibration damping device of this embodiment, the rubber bushing 10 is assembled press fit into the bore 13 of the mounting member 12 so that the rubber bushing 10 is retained fitting into the mounting member 12. At this time, the resin outer sleeve 18 constricts in diameter in association with elastic deformation, as it is press fit at the outer surface thereof into the mounting member 12. Once press fit, a first the portion of the outer sleeve 18 situated facing the recessed portion 28 of the mounting member 12 expands in the diameter by means of elastic recovery force in order to enter the recessed portion 28, whereby the outer surface of the outer sleeve 18 deforms to a stepped configuration conforming to the inner surface of the mounting member 12.

More specifically, it deforms to the stepped configuration shown in FIG. 1, wherein the portion corresponding to the recessed portion 28 is a large-diameter portion 34, and the portion corresponding to the non-recessed portion 30 is a small-diameter portion 36. In this state, a first engaged stepped face 38 is produced on an outer circumferential surface of the outer sleeve 18, which is engaged with the stepped face 32 of the mounting member 12 in the axial direction, specifically in the leftward direction as seen in FIG. 1, with a slight residual space therebetween. This engagement in the axial direction of these first engaging and engaged stepped faces 32 and 38 produces high resistance to dislodging of the rubber bushing 10 from the mounting member 12, thus effectively preventing dislodging of the rubber bushing 10 from the mounting member 12. Hereinbelow, the resistance to dislodging is referred to as the "dislodging resistance" where appropriate.

Figure 5A:
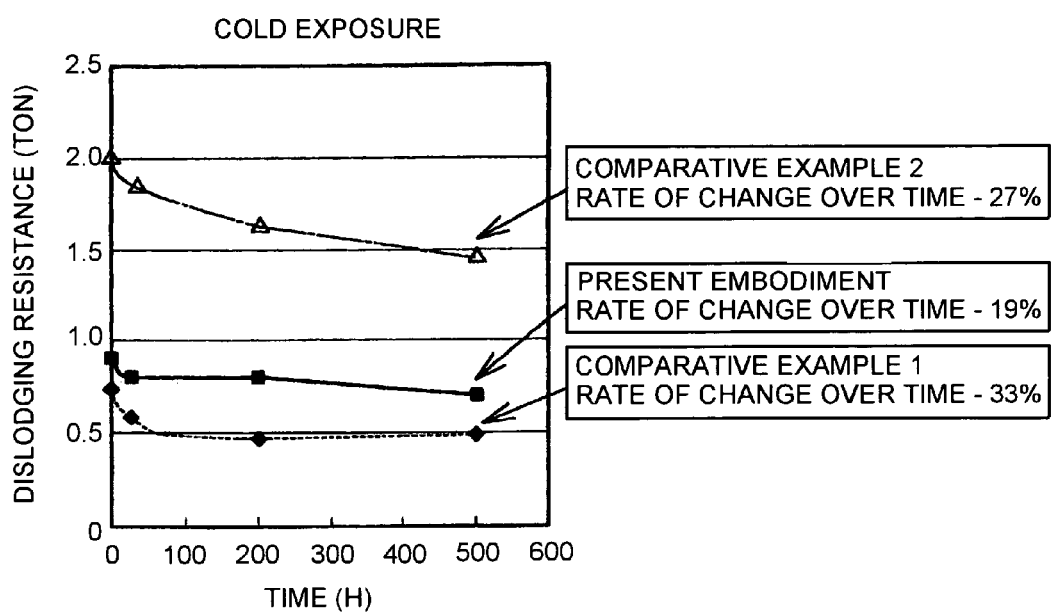
FIGS. 5A and 5B are graphical representations showing changes of resistance to dislodging over time of the rubber bushing of the present cylindrical vibration damping device, together with results of comparative examples.
Figure 5B:
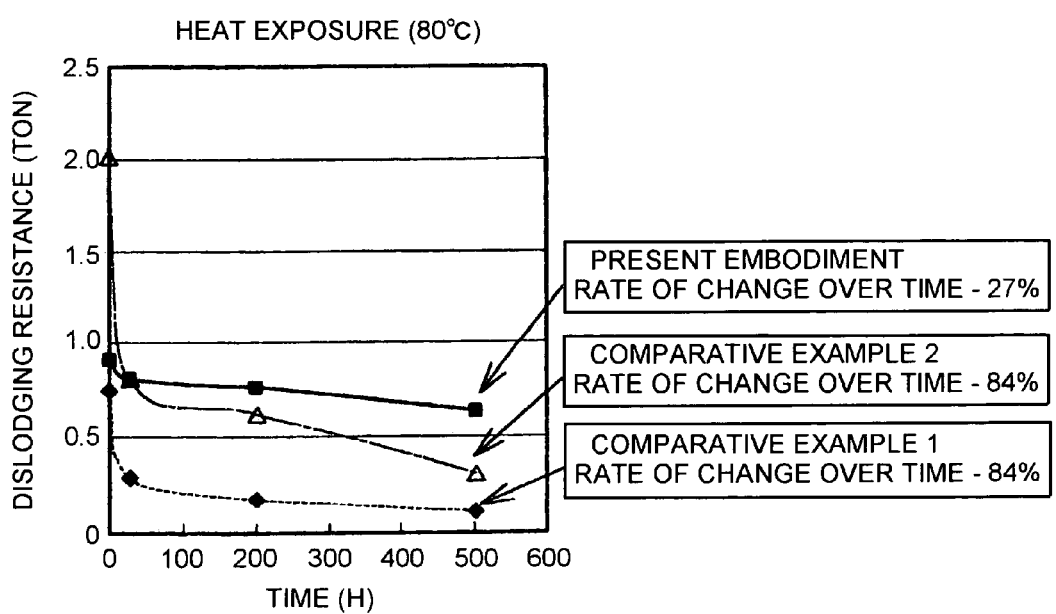

Specimens of cylindrical vibration damping devices according to the present embodiment shown in FIGS. 1–4, and comparative examples 1, 2 shown in FIGS. 5A and 5B were prepared, and were actually measured in terms of dislodging resistance. Measurements of the present invention are demonstrated in graphs of FIGS. 5A and 5B in comparison with measurements of the comparative examples 1, 2.

Figure 6A:
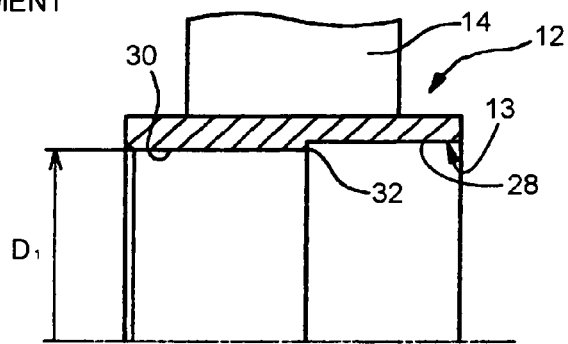
FIG. 6A is a schematic view showing a configuration of an inner surface of a cylindrical bore of the mounting member of the present vibration damping device.
Figure 6B:
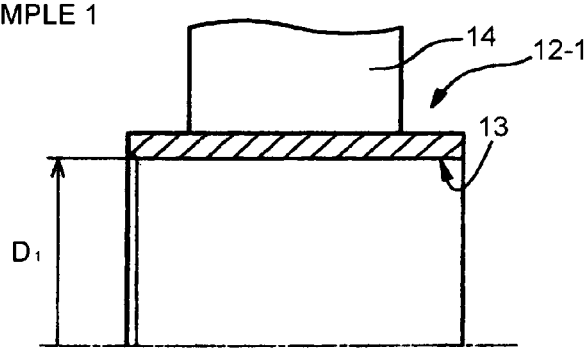
FIGS. 6B and 6C show corresponding ones of the comparative examples, respectively.
Figure 6C:
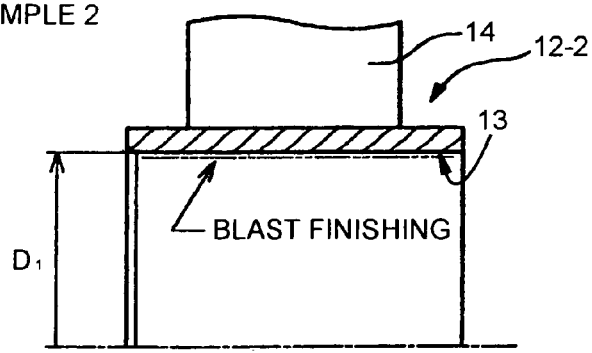

Contrary to the mounting member 12 in the present embodiment, the mounting member 12-1 of the comparative example 1 shown in FIG. 6B is devoid of the recessed portion 28 and the stepped face 32, but has an axially straight inner surface configuration. The mounting member 12-1 has a constant inner diameter D1, which is approximately equal to that of the non-recessed portion 30 of the outer sleeve 18 in the present embodiment. The mounting member 12-2 of the comparative example 2 shown in FIG. 6C has the same configuration as the mounting member 12-1, and has an inner surface rugged by blast finishing to have the surface roughness of 30 μm, while a surface of metal generally measures a few μ/m.

More specifically, the graph of FIG. 5A shows changes over time of values of dislodging resistance of these specimens in the case where these specimens left in room temperature after their press fit, while the graph of FIG. 5B shows the same in the case where these specimens left in hear of 80° C. after their press fit.

As is understood from the result shown in FIG. 5A, under the room temperature, the present invention exhibits a relatively low rate of change over time of dislodging resistance (−19%) in comparison with those of comparative examples, i.e., −27% for comparative example 1 and −33% for comparative example 2. Therefore, the present invention is excellent in constancy of the dislodging resistance, while the value of the dislodging resistance at 500 hours is lower than that of the comparative example 1 due to their initial value differences.

Under the heat of 80° C., as is apparent from the result shown in FIG. 5B, the present invention exhibits a considerably low rate of change over time of dislodging resistance (−27%), while the comparative examples 1 and 2 experiences a significant drop of dislodging resistance, i.e., −84%.

As is apparent from the aforesaid description, the cylindrical vibration damping device of the present invention can enhance its dislodging resistance by means of engagement in the axial direction of these engaging and engaged stepped faces 32, 38 of the outer sleeve 18 and the mounting member 12, thus effectively preventing dislodging of the rubber bushing 10 from the mounting member 12.

According to the present embodiment, the outer sleeve 18 can be engaged with the mounting member 12 in the axial direction, without being exposed to the atmosphere. This arrangement makes it possible to solve the conventional problems of the cylindrical vibration-damping device as shown in FIG. 28, which is deterioration due to exposure of the outer sleeve 206 to the atmosphere at a portion projecting outwardly from the mounting member 208, and due to cracking of the outer sleeve 206 as a result of the portion being struck by a flying pebble or the like.

Further, the cylindrical vibration damping device no longer suffers from limitations regarding shape of the outer sleeve 10 due to necessity of the long rubber bushing relative to the mounting member 12, resulting in high degree of freedom in designing the damping device. While the conventional cylindrical vibration damping device shown in FIG. 28 includes the outer sleeve 206 having a thick walled portion projecting radially outwardly, and suffers from a problem of cracking of the outer sleeve 206 due to excess squeezing of the thick walled portion during the press fit thereof into the mounting member 12. In this regards, the outer sleeve 18 in the present embodiment has an axially straight outer surface configuration, whereby the present cylindrical vibration-damping device is also free from this conventional problem.

Figure 7A:
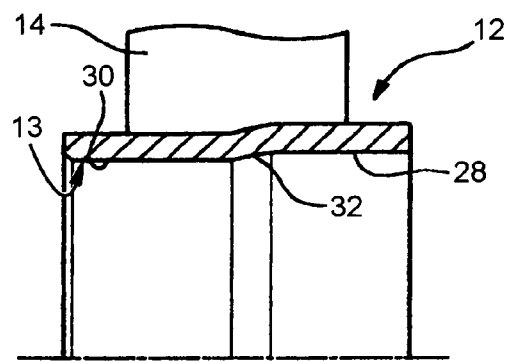
FIGS. 7A–7C respectively show modified inner surface configurations of the cylindrical bore of the mounting member of the present cylindrical vibration damping devices, respectively.
Figure 7B:
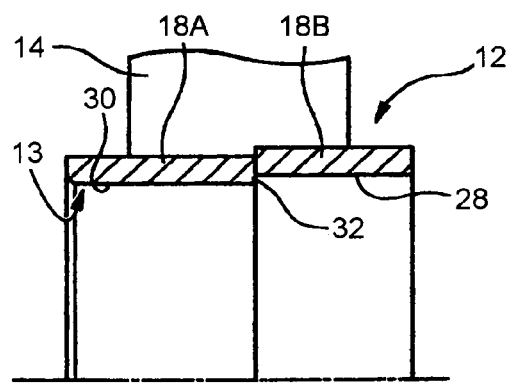
Figure 7C:
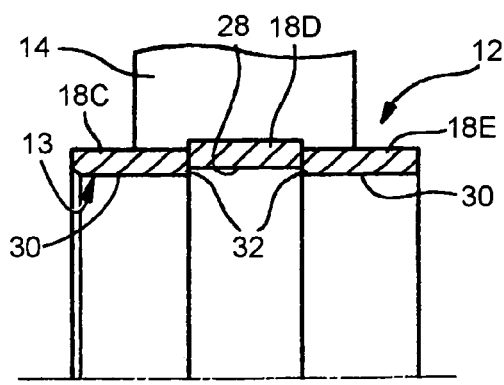

Referring next to FIGS. 7A–7C, there are shown examples of modifications of the first embodiment. FIG. 7A shows one example where the stepped face 32 has a sloped configuration formed by necking and FIG. 7B shows another example where the mounting member 12 composed of two segments 18A and 18B of round cylindrical configuration, which are assembled together in their axial direction by welding, for example. The segment 18A has a small diameter and defines by its inner circumferential surface the non-recessed portion 30, and the segment 18B has a large diameter and defines by its inner circumferential surface the recessed portion 28. The stepped face 32 is formed at boundary between the two segments 18A 18B.

Yet another modification shown in FIG. 7C is the mounting member 12 composed of three segments 18C, 18D and 18E. The segment 18D is located axially intermediate portion and has a largest inner diameter for providing the recessed portion 28 by its inner circumferential surface. The segments 18C and 18E situated axially opposite sides of the segment 18D have an inner diameter smaller than that of the segment 18D in order to define the non-recessed portions 30, 30 by their inner circumferential surfaces, and cooperate with the segment 18D to form at boundary therebetween a pair of stepped faces 32, 32 facing mutually opposite axial directions.

In the modifications as shown in FIGS. 7B and 7C, the mounting member 12 is formed by assembling a plurality of cylindrical segments having different inner diameters, and the recessed portion 28 is formed by means of the segment having the largest inner diameter. This makes it easy to form the recessed portion 28 and the stepped face 32 onto the inner circumferential surface of the cylindrical bore of the mounting member 12.

In the modification as shown in FIG. 7C, the rubber bushing 10 is effectively prevented from dislodging in either opposite axial direction thereof. Therefore, if the rubber bushing 10 is devoid of the flange portion 24, namely, if the rubber bushing 10 is not prevented from dislodging in one axial direction thereof by means of an abutting contact of the flange portion 24 with one axial end face of the mounting member 12, the dislodging of the rubber bushing 10 from the mounting member 12 in both opposite axial directions are surely prevented with no problem.

Figure 8:
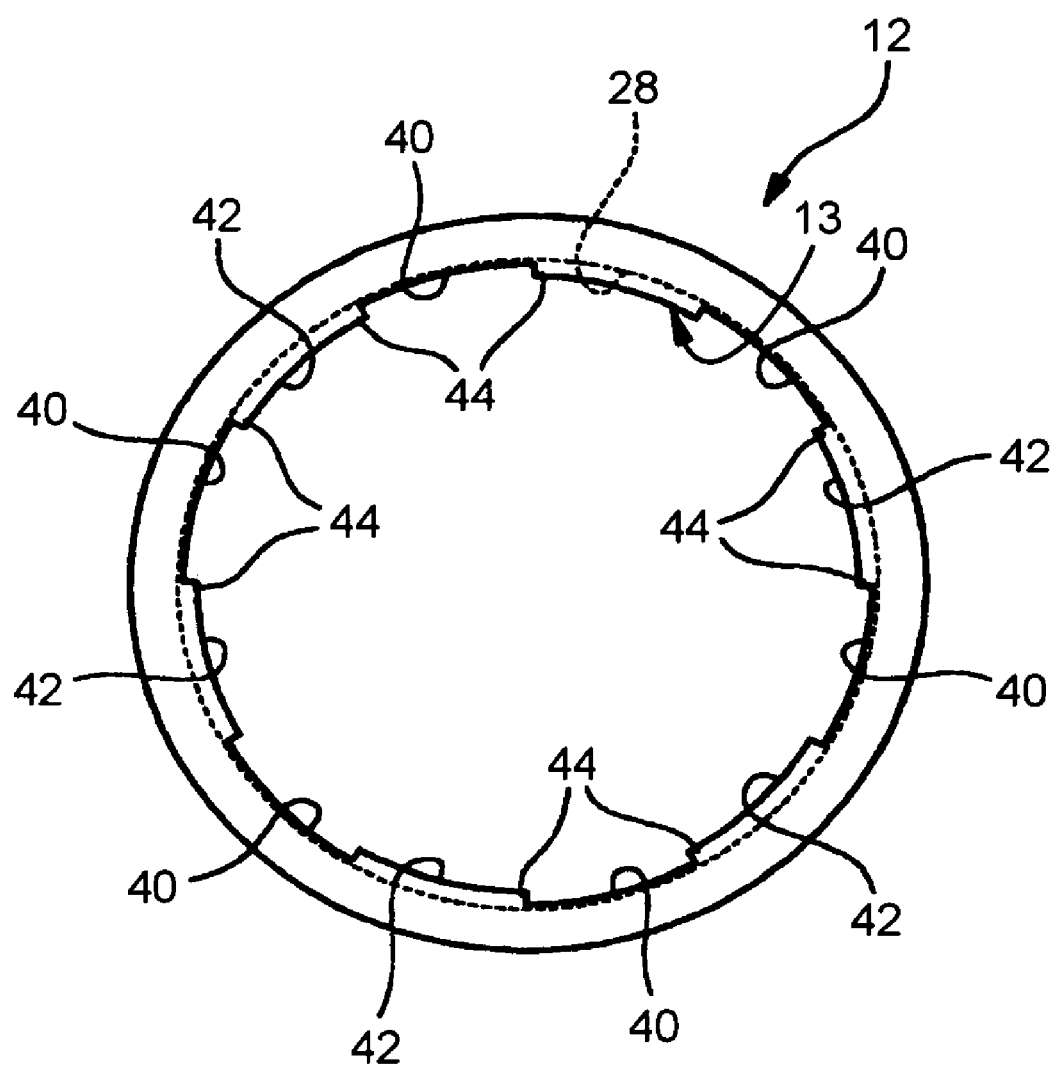
FIG. 8 shows another modified inner surface configuration of the cylindrical bore of the mounting member of the present cylindrical vibration-damping device.

Yet another modification is shown in FIG. 8 wherein the mounting member 12 has an inner circumferential surface provided with recessed portions 40 recessed diametrically outward and non-recessed portions 42, which are arranged by turns in the circumferential direction, while extending parallel to one another in the axial direction of the mounting member 12. The mutually adjacent recessed and non-recessed portions 40, 42 forms at boundary therebetween stepped faces 44 extending partially in the axial direction of the device.

Since the inner circumferential surface of the cylindrical bore of the mounting member 12 is thus arranged, the outer sleeve 18 press fit into the bore of the mounting member 12 deforms to a configuration conforming to the inner surface of the mounting member 12. As a result, the rubber bushing 10 is strongly bonded relative to the mounting member 12 in the circumferential direction.

In the aforementioned embodiment, the outer sleeve 18 has an axially straight outer surface configuration. Alternatively, the outer sleeve 18 may have a non-straight outer surface configuration in the axial direction. FIGS. 9B–9E show examples of the outer sleeves 18 each having axially non-straight outer surface configuration. In the outer sleeve 18 shown in FIG. 9B, an annular projection 46 protruding diametrically outward is formed at a first portion to be situated facing the recessed portion 28 of the mounting member 12.

Figure 9A:
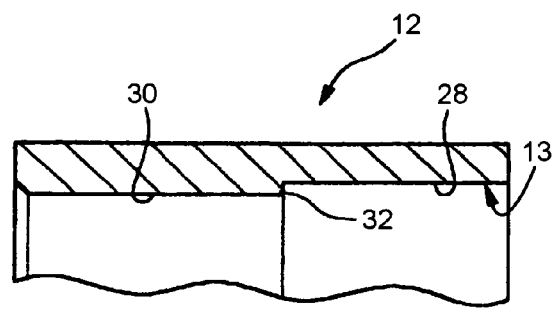
FIG. 9A shows an example of configuration of the inner surface of the mounting member.
Figure 9B:
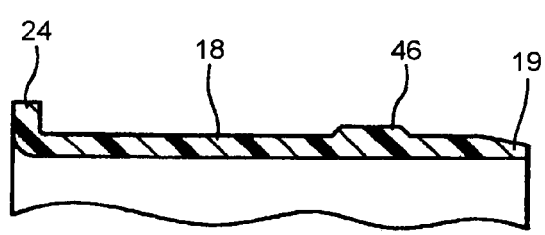
FIGS. 9B–9E show modified configurations of the rubber bushing of the present cylindrical vibration damping device.
Figure 9C:
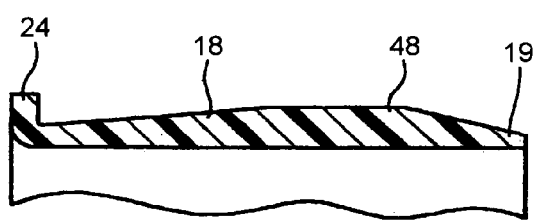

In FIG. 9C, the outer surface of the outer sleeve 18 is shaped to have an outer diameter once gradually increasing as it goes from the flange portion 24 toward the axially intermediate portion, then being held in constant over a given axial length, and then gradually decreasing as it goes toward the axial end opposite the flange portion 24. Thus, a projection 48 protruding diametrically outward is formed at a first portion to be situated facing an area of the mounting member 12 extending over the non-recessed portion 30 as well as the recessed portion 28.

Figure 9D:
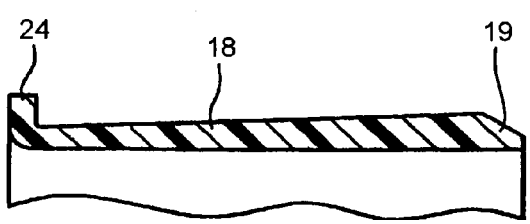
Figure 9E:
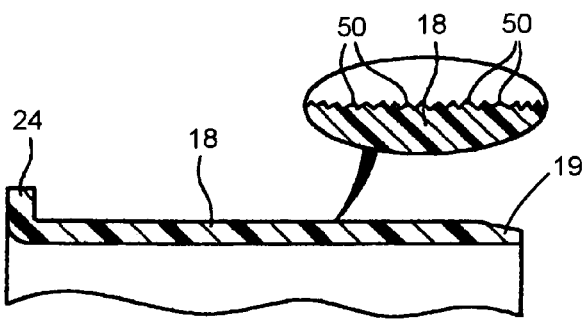

In FIG. 9D, the outer surface of the outer sleeve 18 is shaped to have an outer diameter gradually increasing as it goes from the flange portion 24 toward the axial end opposite the flange portion 24. In FIG. 9E, the outer surface of the outer sleeve 18 is shaped to have fine recesses and projections 50.

Figure 10A:
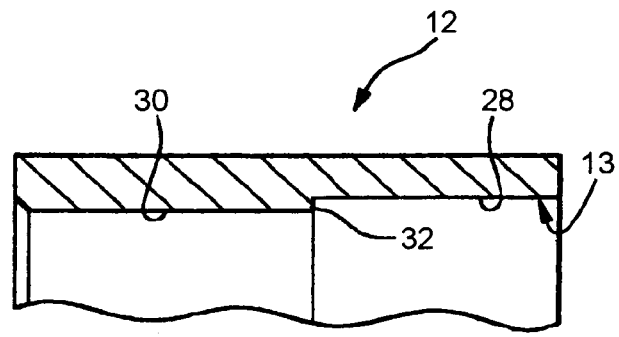
FIG. 10A is a view corresponding to the view of FIG. 9A, and FIGS. 10B–10C show modified configurations of the rubber bushing of the present cylindrical vibration damping device.
Figure 10B:
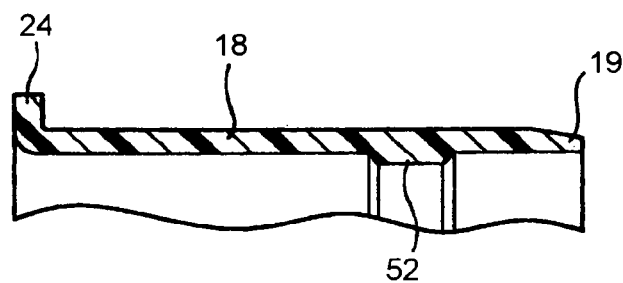
Figure 10C:
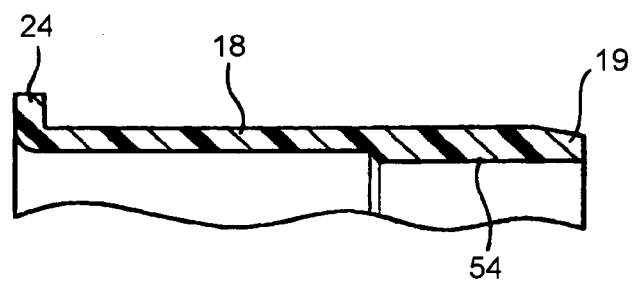

FIGS. 10A–10C, show examples of the outer sleeves 18 each having an inner circumferential surface of non-straight configuration. Described in detail, FIG. 10B shows the outer sleeve 18 whose inner surface is shaped to have a projection 52 protruding diametrically inward formed at a first portion to be situated facing the recessed portion 28 of the mounting member 12. In FIG. 10C, the inner surface of the outer sleeve 18 has a configuration in which an axial portion opposite to the recessed portion 28 of the mounting member 12 entirely projects diametrically inward with an annular shape to thereby provide a projection 54.

Referring next to FIGS. 11–14, shown is a vibration-damping device constructed according to a second embodiment of the present invention, which may be applied to a linking portion to link a trailing arm to a vehicle body in a torsion beam type rear suspension of an automotive vehicle, like the first embodiment. The device of this second embodiment is different from the device of the preceding first embodiment in that an outer sleeve 68 is devoid of a flange portion, and has a pair of stepped faces 32 facing opposite axial directions instead. The same reference numerals as used in the first embodiment will be used in this second embodiment to identify the functionally corresponding or structurally similar elements, which will not be described in detail to avoid redundancy of description.

Figure 12B:
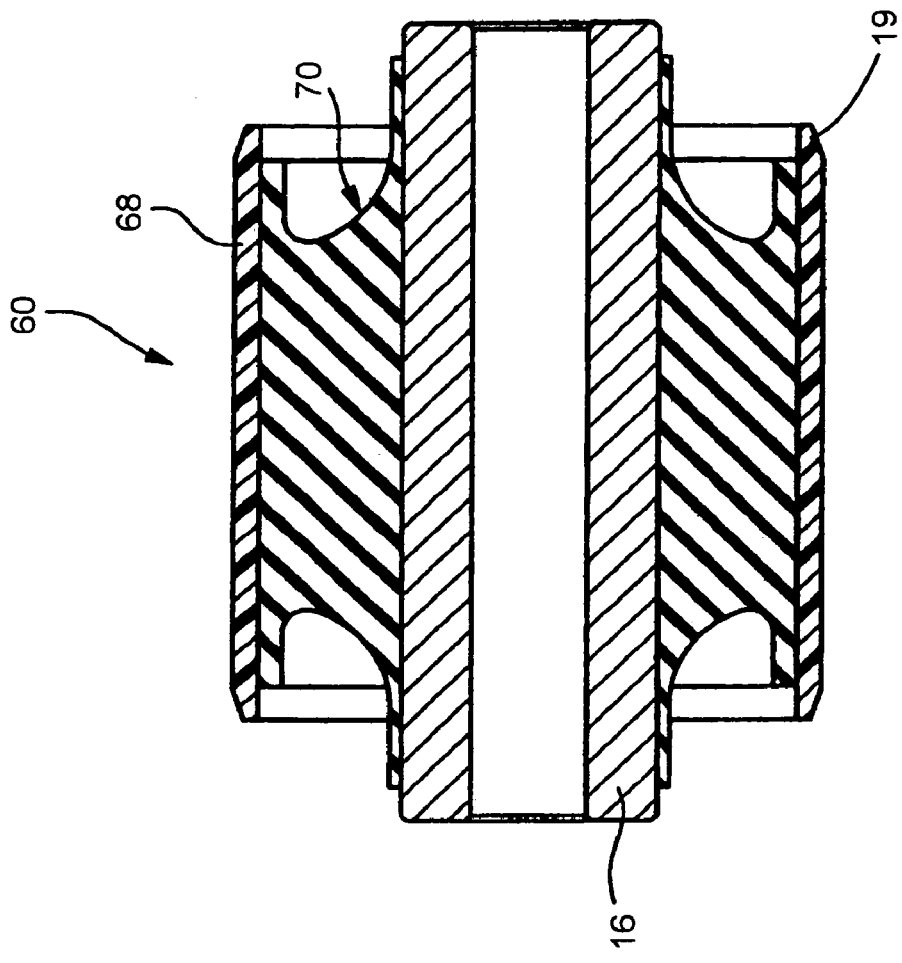
FIG. 12B is a cross sectional view of the rubber bushing, taken along line B—B of FIG. 12A.
Figure 12A:
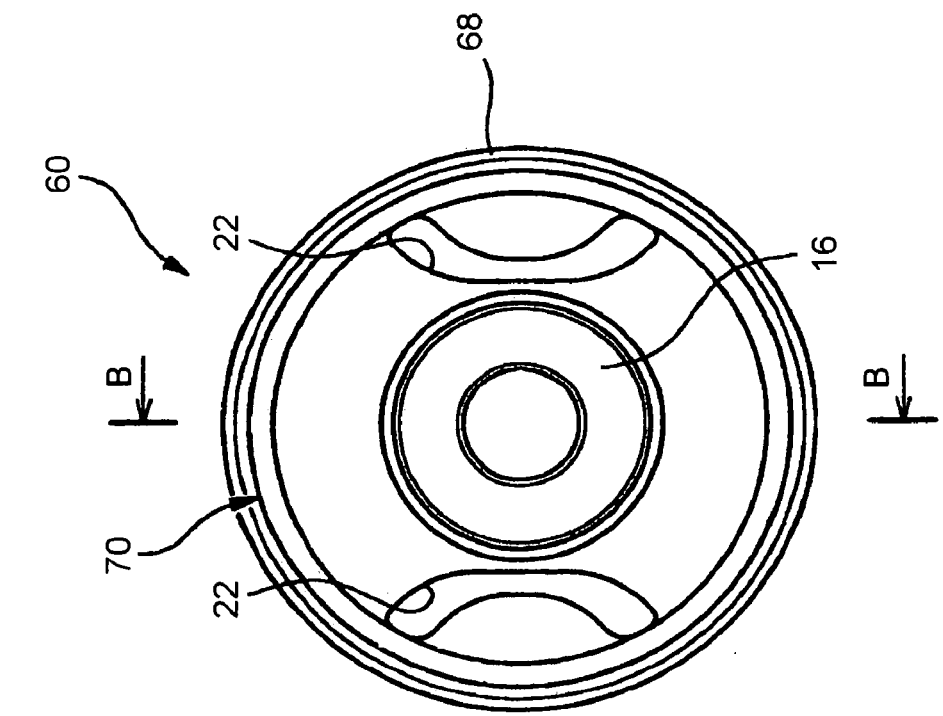
FIG. 12A is a bottom plane view of a rubber bushing of the cylindrical vibration-damping device of FIG. 11.

As shown in FIG. 12, a rubber bushing 60 has the inner sleeve 16 of cylindrical shape, an outer sleeve 68 similarly of cylindrical shape, and an rubber elastic body 70 interposed between and elastically connecting the inner and outer sleeves 16, 68. This rubber elastic body 70 is integrally bonded to the inner and outer sleeves 16, 68 through vulcanization of a rubber material for forming the rubber elastic body 70. Like in the first embodiment, the outer sleeve 68 is made of resin.

According to the second embodiment, the outer sleeve 68 as well as the elastic body 70 do not have flange portions at their axial ends, as shown in FIG. 12. That is, the rubber bushing 60 is of flangeless type, and axially opposite end portions 19 thereof have the tapered outer surface configuration.

Figure 14:
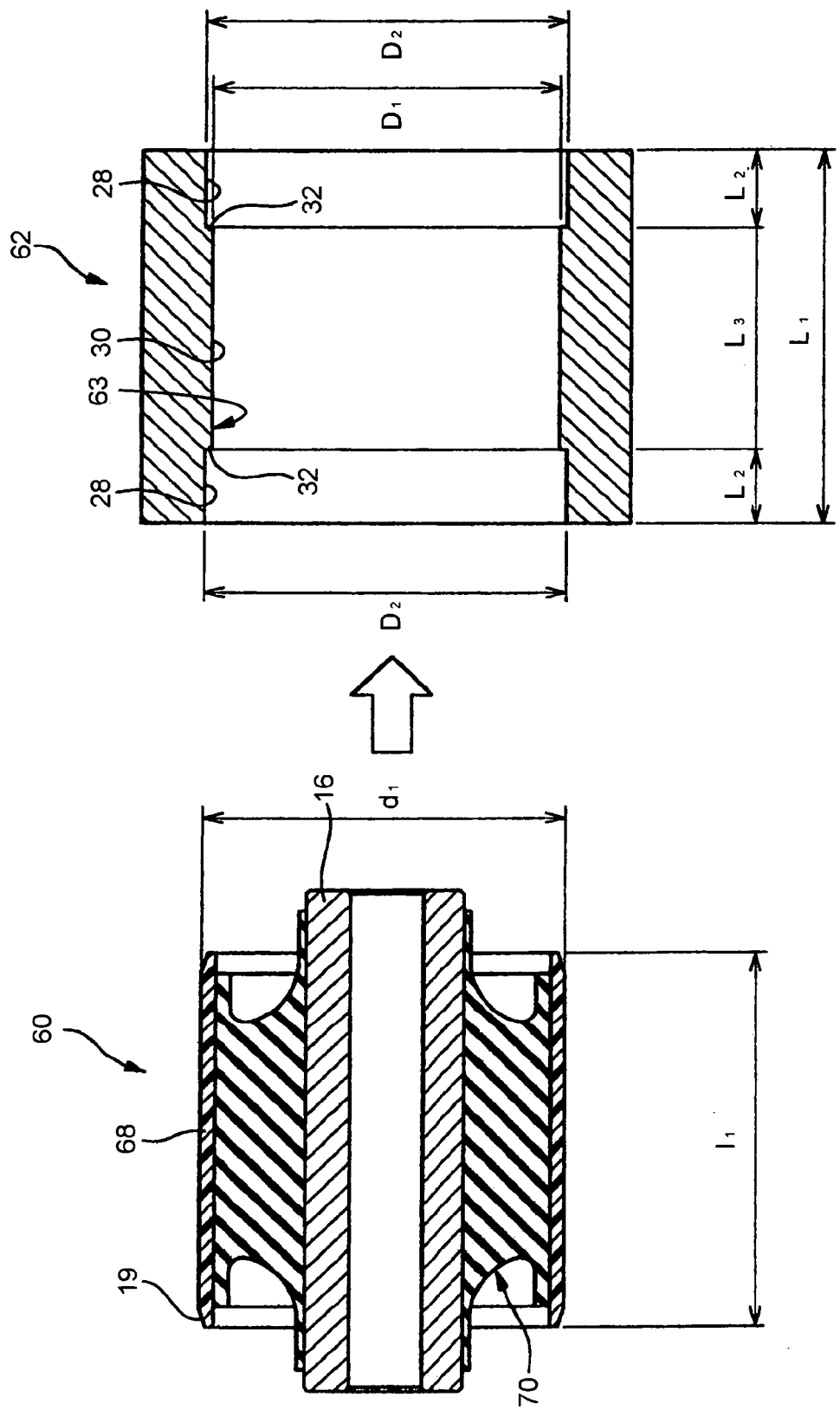
FIG. 14 is a view showing the rubber bushing and the mounting member mutually preset for their assembly, and suitable for recognizing relationships between dimensions of portions of the rubber bushing and the mounting member as well as the direction of press fitting of the rubber bushing into the mounting member.

As is apparent from FIG. 14, the rubber bushing 60 has an outside diameter $d_1$ of 67 mm, and has an axial length $l_1$ that is approximately equal to an axial length $L_1$ of a mounting member 62.

A variety of resin including a thermoplastic resin and heat-setting resin may be usable for fabricating the outer sleeve 68, like in the first embodiment.

Figure 13B:
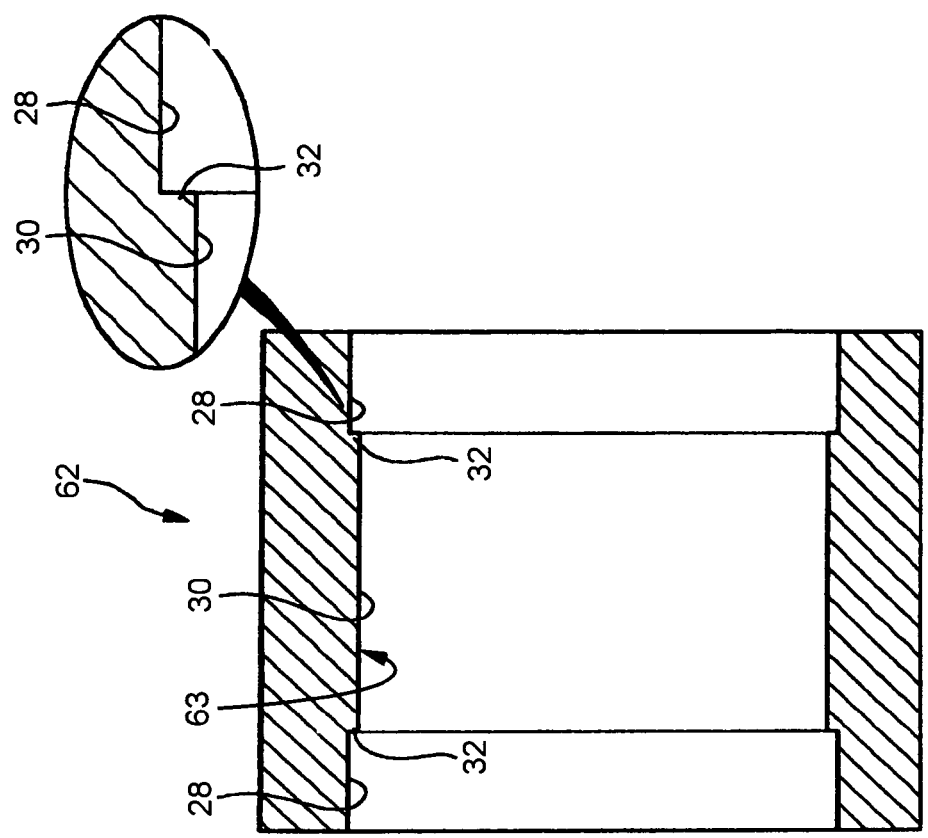
FIG. 13B is an axial cross sectional view of the mounting member of FIG. 13A.
Figure 13A:
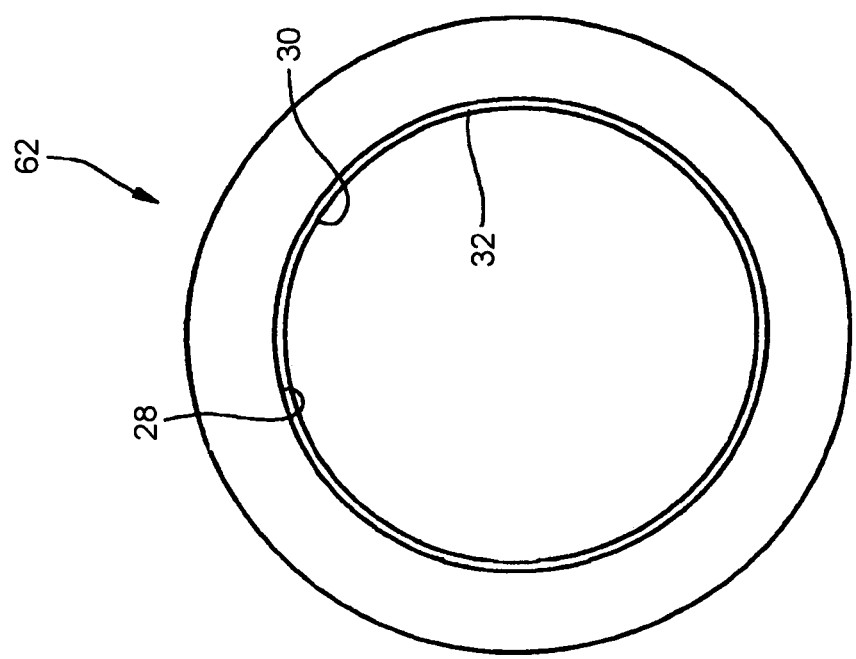
FIG. 13A is a bottom plane view of a mounting member of the cylindrical vibration-damping device of FIG. 11.

On the other hand, the mounting member 62 has an overall cylindrical shape with a cylindrical bore 63 whose profile appropriately corresponds to that of the rubber bushing 60, as shown in FIGS. 13A and 13B. The mounting member 62 is made entirety of metal.

Onto the cylindrical bore 63 of the mounting member 62 are formed a pair of recessed portions 28 recessed diametrically outward, and situated at both axial end portions so as to extend axially inward from either axial end face toward an axially intermediate portion of the mounting member 62. A pair of engaging stepped faces 32 are formed at the boundaries of the recessed portions 28, 28 and the non-recessed portions 30 interposed between the recessed portions 28, 28.

The inside diameter $D_2$ of the recessed portions 68 is made equal to the outside diameter $d_1$ of the outer sleeve 68 prior to being press fit. The inside diameter $D_1$ of the non-recessed portion 30, on the other hand, is smaller than the outside diameter d, of the outer sleeve 68, e.g., a 65 mm diameter. The total dimension of the axial lengths $L_2+L_2$ of the pair of recessed portions 28 is approximately equal to one-half the entire axial length $L_1$ of the mounting member 62. It should be noted that the dimension of $L_2$ may be modified appropriately.

As is understood from FIG. 14, the rubber bushing 60 is assembled press fit into the bore 63 of the mounting member 62 from one axial end portion so that the rubber bushing 60 is retained fitting into the mounting member 62. At this time, the resin outer sleeve 68 constricts in diameter in association with elastic deformation, as it is press fit at the outer surface thereof into the mounting member 62. Once press fit, the first portions of the outer sleeve 68 situated facing the recessed portions 28 of the mounting member 62 expand in the diameter by means of elastic recovery force in order to enter the recessed portions 28, whereby the outer surface of the outer sleeve 68 deforms to a stepped configuration confirming to the bore 63 of the mounting member 62.

Figure 11:
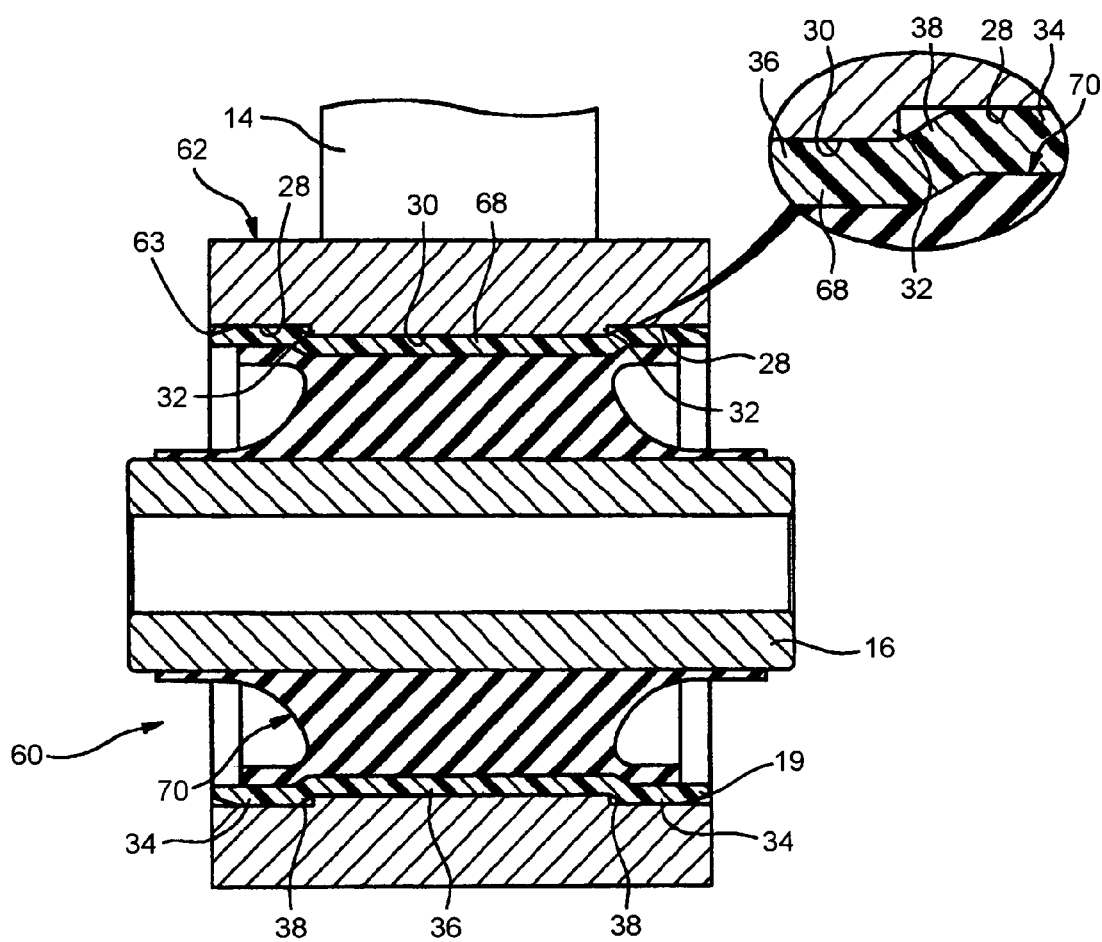
FIG. 11 is an elevational view in axial or vertical cross section of a cylindrical vibration-damping device constructed according to a second embodiment of the invention.

More specifically, it deforms to the stepped configuration shown in FIG. 11, wherein the axially opposite end portions corresponding to the recessed portions 28, 28 are the large-diameter portions 34, 34 and the axially intermediate portion corresponding to the non-recessed portion 30 is the small-diameter portion 36. In this state, a pair of engaged stepped faces 38, 38 are produced on an outer circumferential surface of the outer sleeve 68, which are engaged with the pair of engaging stepped faces 32, 32 of the mounting member 62 in opposite axial direction, respectively.

This engagements in opposite axial directions of these pair of stepped faces 32, 32 and 38, 38, produce high resistance to dislodging of the rubber bushing 60 from the mounting member 62 in opposite axial directions, thus effectively preventing dislodging of the rubber bushing 60 from the mounting member 62 in the opposite axial directions. Namely, the engaging and engaged faces 32, 38 at one axial end portion of the cylindrical vibration-damping device face opposite axial directions, and are held in engagement in order to prevent the dislodging of the rubber bushing 60 from the mounting member 62 in a first axial direction, while the stepped faces 32, 38 at the other axial end portion of the device are held in engagement in order to prevent the dislodging of the rubber bushing 60 from the mounting member 62 in the other axial direction opposite to the first axial direction.

Therefore, the cylindrical vibration damping device constructed according to the present embodiment can enhance its dislodging resistance by means of the engagements of the stepped faces 32, 32, 38, 38 at its opposite axial end portions, thus effectively preventing dislodging of the rubber bushing 60 from the mounting member 62.

Like in the first embodiment, the outer sleeve 68 can be engaged with the mounting member 62 in the axial direction without being exposed to the atmosphere, thereby exhibiting the same advantage of the present invention as discussed above with respect to the first embodiment. Further, the outer sleeve 68 has an axially straight outer surface configuration, like in the first embodiment, similarly exhibiting the effect of the invention as discussed above with respect to the first embodiment.

Further, the pair of engaged stepped faces 38 formed on opposite axial end portions of the outer sleeve 68 and facing mutually opposite axial directions, are held in engagement with the engaging stepped faces 32 formed on opposite axial end portions of the bore 63 of the mounting member 62 and facing mutually opposite axial directions. This arrangement makes it possible to prevent dislodging of the rubber bushing 60 assembled press fit into the mounting member 62 from the mounting member 62 in either axial direction.

This advantage of the present embodiment permits the use of the rubber bushing 60 of flangeless type in the cylindrical vibration damping device of this invention. The rubber bushing 60 of flangeless type is free from a problem of directionality when press fitting the rubber bushing 60 into the mounting member 62, thereby providing a satisfactory press fit procedure.

Since the recessed portions 28, 28 are formed onto the bore 63 of the mounting member 62 at both axial end portions, making it easy to form the recessed portion 28 onto the bore 63 of the mounting member 62, leading to a reduced processing cost and a reduced manufacturing cost of the cylindrical vibration damping device.

Figure 15:
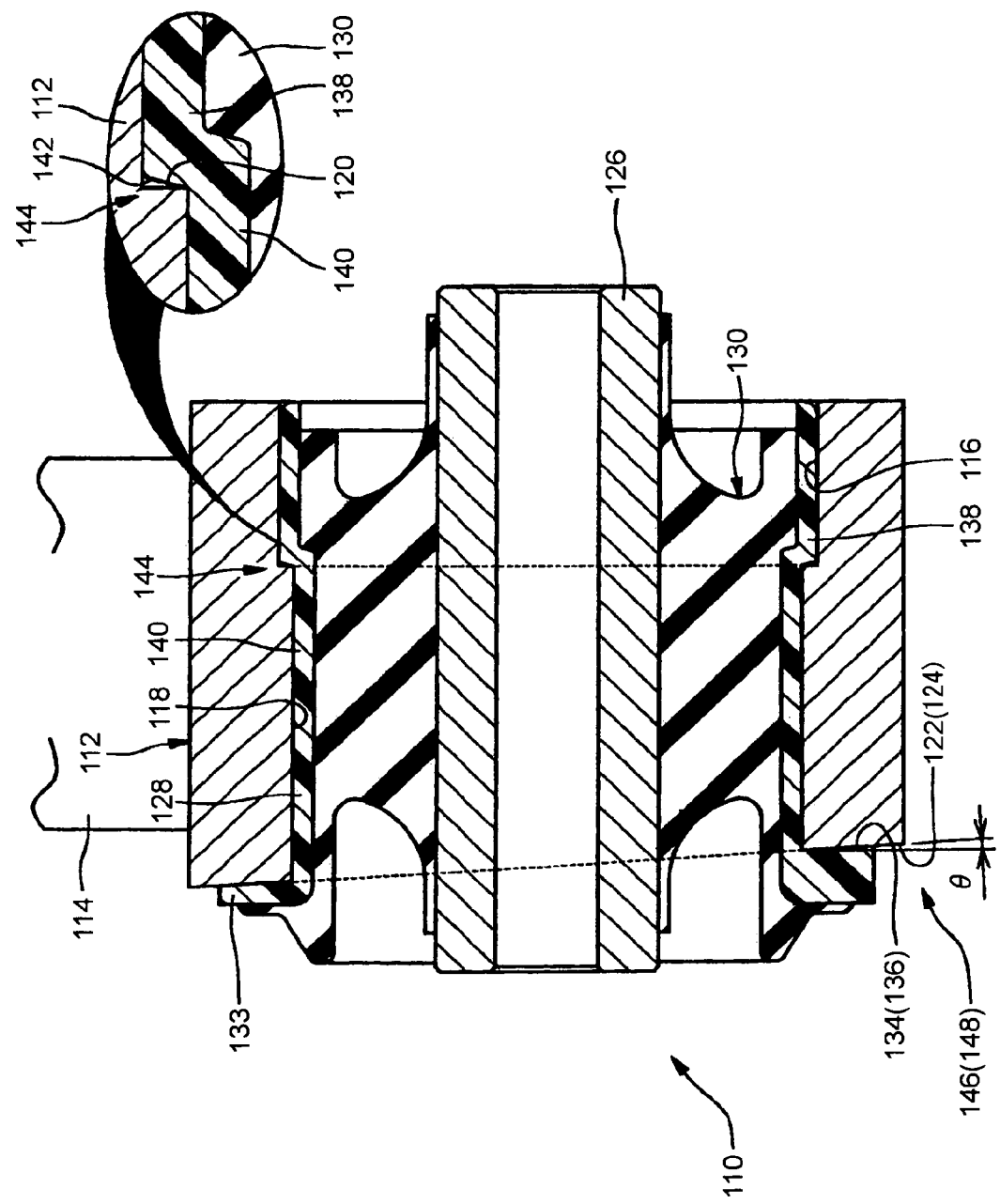
FIG. 15 is an elevational view in axial or vertical cross section of a cylindrical vibration-damping device constructed according to a third embodiment of the invention.
Figure 16B:
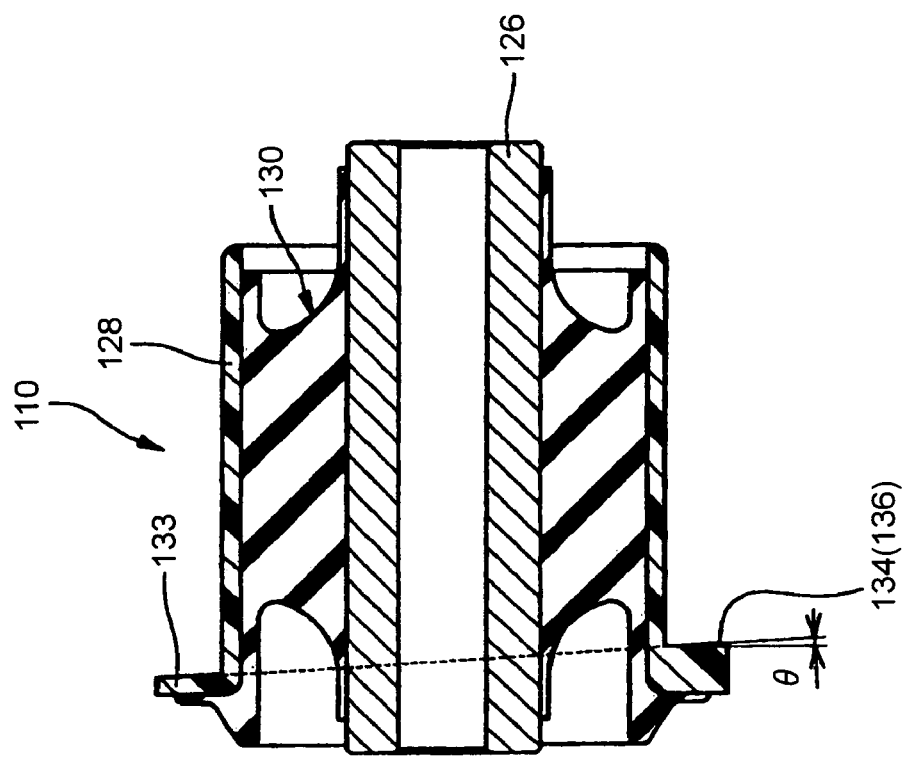
FIG. 16B is a cross sectional view of the rubber bushing, taken along line B—B of FIG. 16A.
Figure 16A:
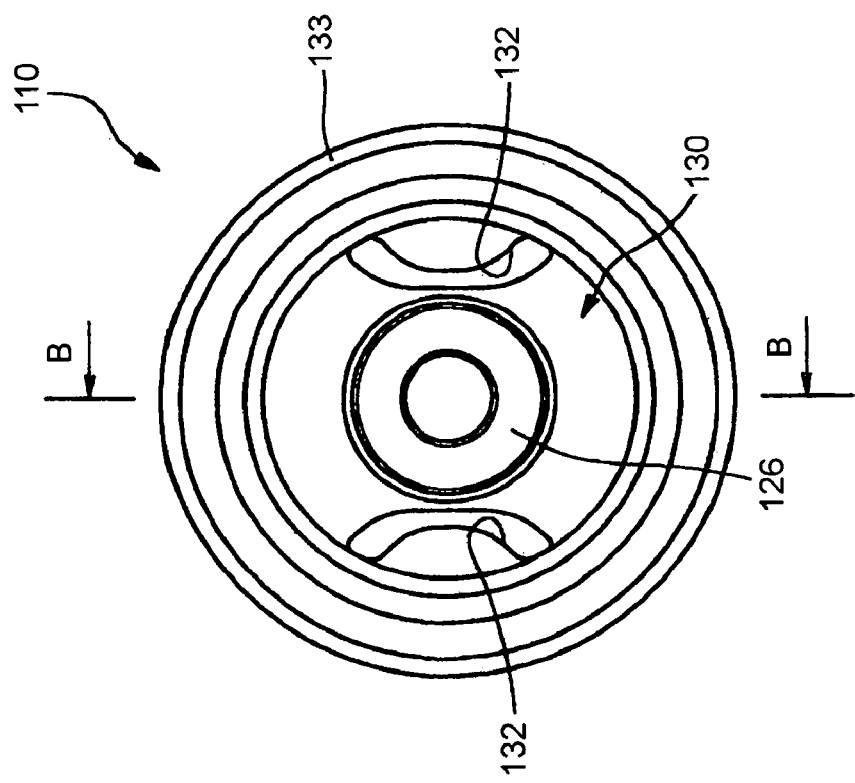
FIG. 16A is a bottom plane view of a rubber bushing of the cylindrical vibration-damping device of FIG. 15.
Figure 17B:
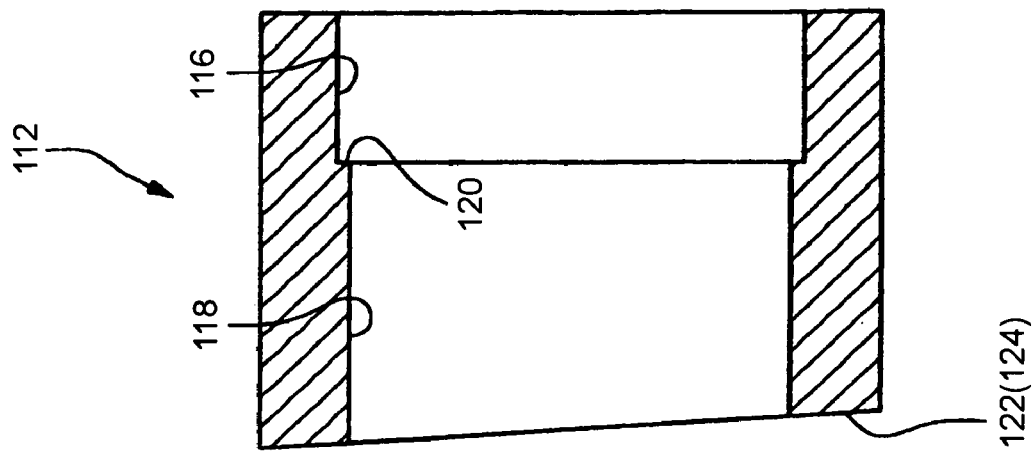
FIG. 17B is an axial cross sectional view of the mounting member of FIG. 17A.
Figure 17A:
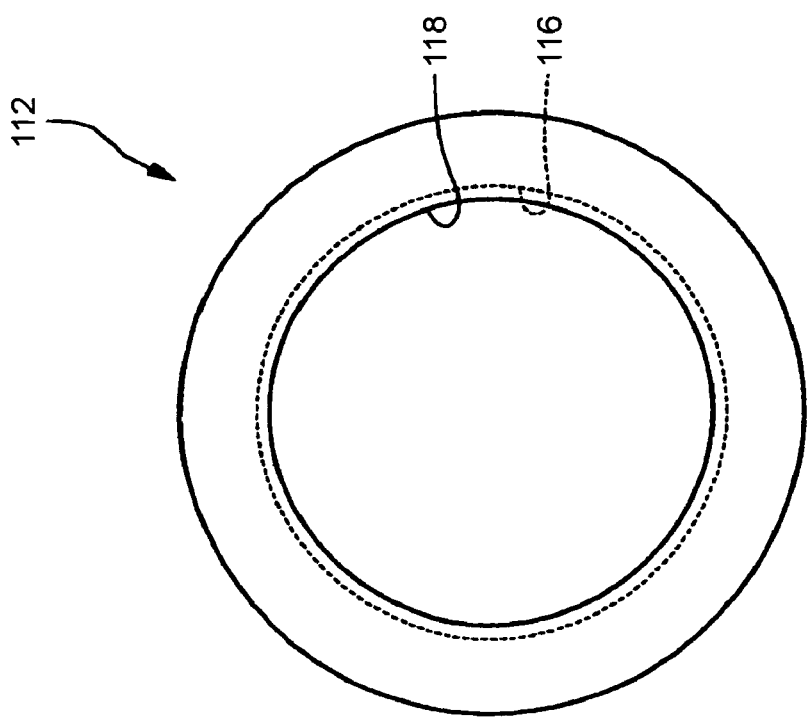
FIG. 17A is a bottom plane view of a mounting member of the cylindrical vibration-damping device of FIG. 15.

Referring next to FIGS. 15–17, there is shown a cylindrical vibration damping device constructed according to a third embodiment of the present invention. The present cylindrical vibration-damping device may be applied to a linking portion to link a trailing arm to a vehicle body in a torsion beam type rear suspension of an automotive vehicle. FIG. 16 shows a rubber bushing 110 of the cylindrical vibration-damping device, and FIG. 17 shows a mounting member 112 having a cylindrical bore 113 into which the rubber bushing 110 will be press fitted. FIG. 15 shows the rubber bushing 110 of FIG. 16 assembled press fit into the mounting member 112 of FIG. 17. In FIG. 15, 114 denotes an arm extending out from the mounting member 112.

Figure 18:
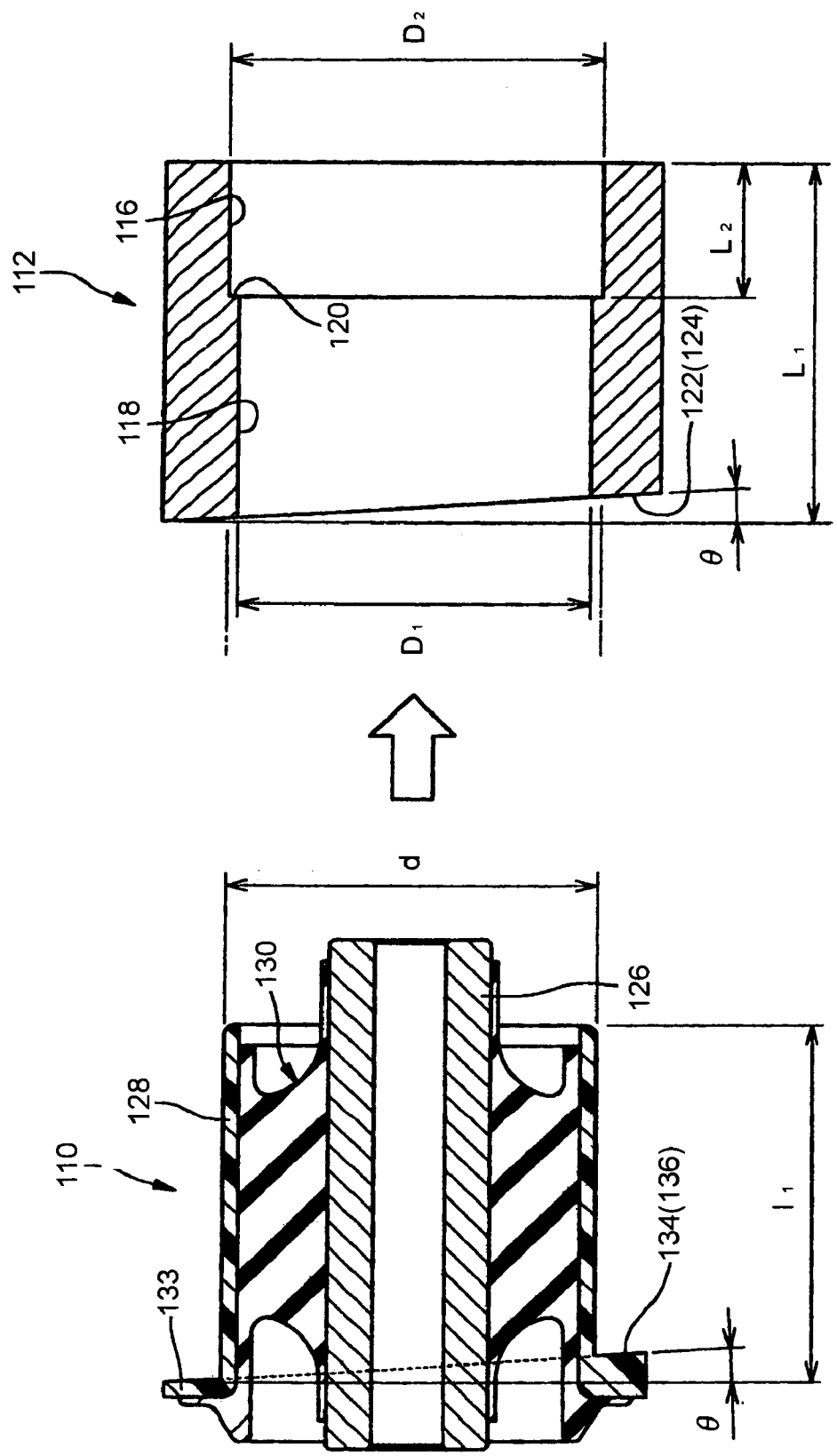
FIG. 18 is a view showing the rubber bushing and the mounting member mutually preset for their assembly, and suitable for recognizing relationships between dimensions of portions of the rubber bushing and the mounting member as well as the direction of press fitting of the rubber bushing into the mounting member.

As shown in FIG. 17, the mounting member 112 has an overall cylindrical shape with the cylindrical bore 113 whose profile appropriately corresponds to that of the rubber bushing 110. The mounting member 112 is made entirety of metal. Onto the inner surface of the mounting member 112 is formed an annular recessed portion (first recessed portion) 116 recessed diametrically outward, and situated at a first axial end portion (the right end in FIG. 18B) with an engaging stepped face formed at the boundary of the recessed portion 116 and an non-recessed portion 118. As shown in FIG. 18, the recessed portion 116 has an axial length of L2.

In the present embodiment, the engaging stepped face constitutes a first engaging face 120. The first engaging face 120 comprising this stepped face is an axis-perpendicular face extending perpendicular to an axial direction of the vibration-damping device. The axial end face on the opposite side from recessed portion 116 constitutes another engaging stepped face in the form of a second engaging face 122. This second engaging face 122 is a sloping face that overall is inclined by angle θ relative to the diametric direction perpendicular to an axial direction of the mounting member 112 as seen in FIG. 18. That is, the entire second engaging face 122 simultaneously forms an anti-rotation stepped face in the form of a third engaging face 124 for preventing rotation.

As is apparent from FIG. 18, the inside diameter $D_2$ of the recessed portion 116 is approximately equal to the outside diameter $d_1$ (e.g., a 67 mm diameter in this embodiment) of an outer sleeve 128 of the rubber bushing 110 prior to being press fit. The inside diameter $D_1$ of the non-recessed portion 118, on the other hand, is smaller than the outside diameter $d_1$ of the outer sleeve 128, e.g., a 65 mm diameter. The axial length $L_2$ of the recessed portion 116 is slightly smaller than one-half the entire axial length $L_1$ of the mounting member 112. It should be noted that a dimension of $L_2$ may be modified appropriately.

On the other hand, as shown in FIG. 16, the rubber bushing 110 has an inner sleeve 126 of round cylindrical shape, the outer sleeve 128 similarly of round cylindrical shape, and a rubber elastic body 130 interposed between and elastically connecting the inner and outer sleeves 126, 128. This rubber elastic body 130 is integrally bonded to the inner and outer sleeves 126, 128 through vulcanization of a rubber material for forming the rubber elastic body 130. The inner sleeve 126 is made of metal, and the outer sleeve 128 is made of resin. Alternatively, a rigid resin could be used for the inner sleeve 126. The rubber elastic body 130 has a pair of voids (gaps) 132 formed in the axial direction as shown in FIG. 16A.

As shown in FIG. 16B, the outer sleeve 128 has a flange portion 133 integrally bonded to one axial end thereof remote from the recessed portion 116 formed onto the mounting member 112. The back face (right face in FIG. 16B) of this flange portion 133 constitutes a superposed face for superposition in the axial direction against the end face of the mounting member 112, i.e., the second engaging face 122, which at the same time constitutes the third engaging face 124. In this embodiment, this superposed face constitutes an engaged stepped face in the form of a second engaged face 134.

In this embodiment, the flange portion 133 has varying wall thickness along the circumferential direction, and the second engaged face 134 thereof constitutes a sloping face inclined by the same angle θ relative to the axis-perpendicular direction as is the third engaging face 124 on the mounting member 112. This second engaged face 134 simultaneously constitutes an anti-rotation stepped face in the form of a third engaged face 136 for preventing rotation.

The rubber bushing 110 has an axial length of the outer sleeve 128, specifically, the axial length $l_1$ of the section excluding the flange portion 133, that is approximately equal to the axial length $L_1$ of the mounting member 112.

In this example, various kinds of resin may be used to fabricate the outer sleeve 128, like in the foregoing embodiments, e.g., a thermoplastic resin, heat-setting resin, e.g., the thermoplastic resins are advantageous for use owing to their excellent impact strength against input vibration and moldability into the outer sleeve 128.

In the cylindrical vibration damping device of this embodiment, the rubber bushing 110 is assembled press fit into the bore of the mounting member 112 from the axial end portion opposite the flange portion 133 as shown in FIG. 18 so that the rubber bushing 110 is retained fitting into the mounting member 112. At this time, the resin outer sleeve 128 constricts in diameter in association with elastic deformation, as it is press fit at the outer surface thereof into the mounting member 12. Once press fit, the portion of the outer sleeve 128 situated facing the recessed portion 116 of the mounting member 112 expands in the diameter by means of elastic recovery force in order to enter the recessed portion 116, whereby the outer surface of the outer sleeve 128 deforms to a stepped configuration conforming to the inner surface of the mounting member 112.

More specifically, it deforms to the stepped configuration shown in FIG. 15, wherein the portion corresponding to the recessed portion 116 is a large-diameter portion 138 and the portion corresponding to the non-recessed portion 118 is a small-diameter portion 140. In this state, the stepped face formed on the outer sleeve 128 by means of this deformation provides a first engaged face 142, which is engaged with the first engaging face 120 of the mounting member 112 in the axial direction, specifically in the leftward direction as seen in FIG. 15. In this embodiment, the first engaging face 120 of the mounting member 112 and the first engaged face 142 of the outer sleeve 128 are brought into engagement with each other to provide a first engaging portion 144.

In this state, the rubber bushing 110 is also in a state such that the second engaged face 134 of the outer sleeve 128 and the third engaged face 136 formed over the entirety of this second engaged face 134, i.e., the superposed face on the back surface of the flange portion 133, simultaneously engage the second engaging face 122 of the mounting member 112 and the third engaging face 124 formed over the entirety of the second engaging face 122. Thus, the rubber bushing 110 is prevented from dislodging in either the rightward or leftward direction as seen in FIG. 15 relative to the mounting member 112, i.e., in one axial direction as well as in the other direction opposite this.

Further, the rubber bushing 110 is prevented from rotating relative to the mounting member 112 by means of engagement in the circumferential direction of the third engaging face 124 and the third engaged face 136 inclined with respect to the axis-perpendicular direction. The third engaging face 124 and the third engaged face 136 constitute a third engaging portion 148, while the second engaging face 122 and the second engaged face 134 constitute a second engaging portion 146.

According to the cylindrical vibration damping device of this embodiment, the outer sleeve 128, once press fit, can be satisfactorily prevented from dislodging from the mounting member 112 in opposite axial directions of the vibration-damping device. Also, the third engaging portion 148, which engages in the circumferential direction to prevent rotation, is formed over the entire second engaging portion 146, whereby in addition to preventing dislodging in the axial direction, the rubber bushing 110 can also be prevented from displacement in a direction of rotation.

It should be appreciated that the inner surface of the mounting member 112 engages the outer surface of the outer sleeve 128 at the first engaging portion 144, thus solving the aforesaid conventional problems of the cylindrical vibration damping device as shown in FIG. 28, which is deterioration in the engaging portion due to exposure of the engaging portion to the atmosphere as a result of the engaging portion being disposed in a portion projecting outwardly in the axial direction from the mounting member, and due to cracking of the engaging portion as a result of the engaging portion being struck by a flying pebble or the like. Provision of this first engaging portion 144 also solves the problem of the outer sleeve 28, i.e., the rubber bushing 110, having considerable axial length.

Figure 20B:
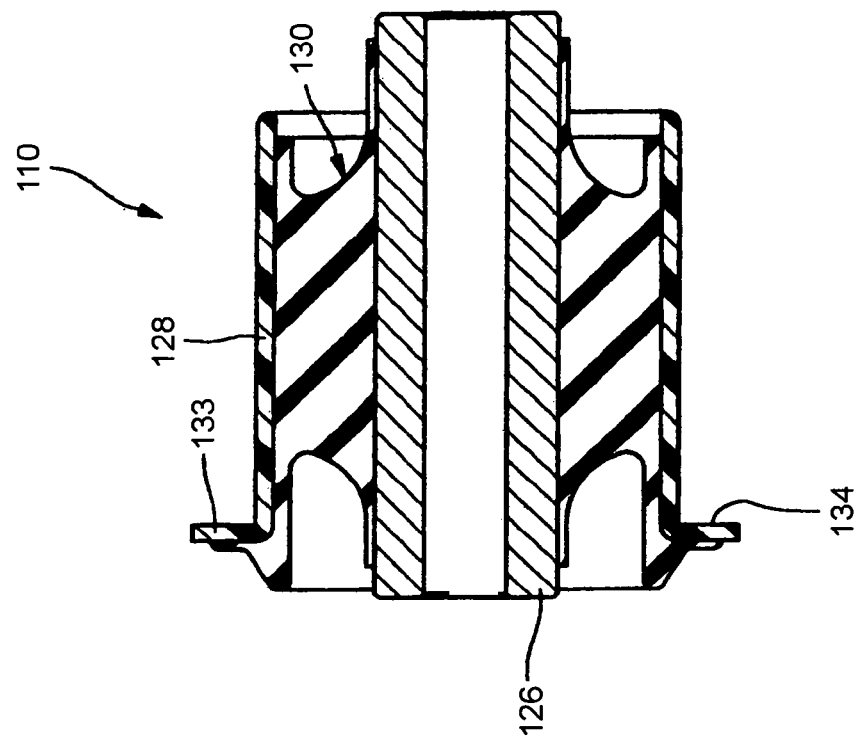
FIG. 20B is a cross sectional view of the rubber bushing, taken along line B—B of FIG. 20A.
Figure 20A:
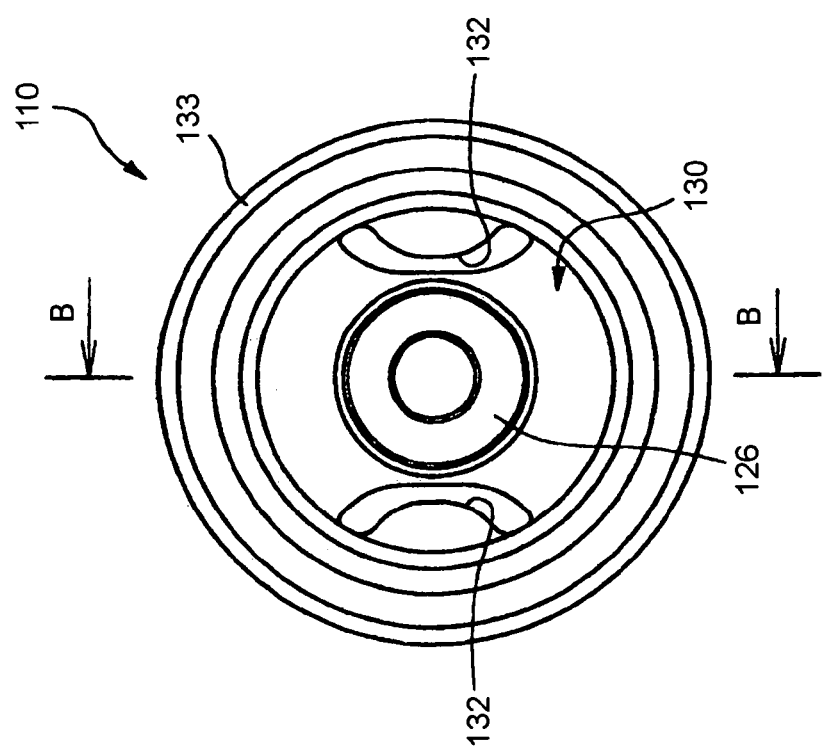
FIG. 20A is a bottom plane view of a rubber bushing of the cylindrical vibration-damping device of FIG. 19.
Figure 22:
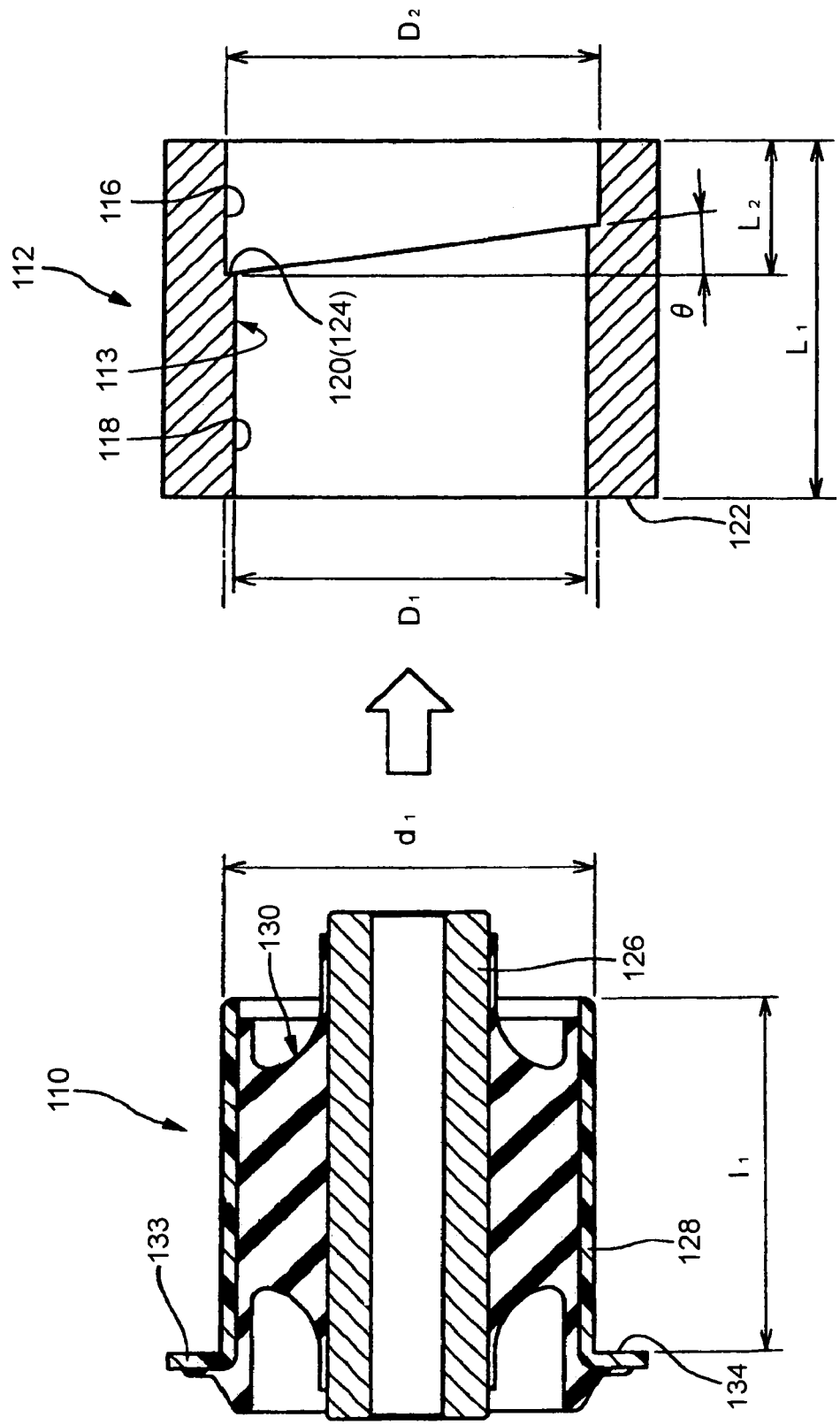
FIG. 22 is a view showing the rubber bushing and the mounting member mutually preset for their assembly, and suitable for recognizing relationships between dimensions of portions of the rubber bushing and the mounting member as well as the direction of press fitting of the rubber bushing into the mounting member.

Referring next to FIGS. 19–22, there is shown a cylindrical vibration-damping device constructed according to the fourth embodiment of the present invention. According to the present embodiment, modifications are made to the cylindrical vibration-damping device according to the third embodiment in the following points. Namely, as shown in FIG. 22, the entirety of the first engaging face 120, which comprises the engaging stepped face of the mounting member 112, constitutes a sloping face inclined by an angle $\theta$ relative to the axial-perpendicular direction. The first engaging face 120 in its entirety forms the third engaging face 124, whereas the second engaging face 122 on the axial end face is constituted as an axis-perpendicular face. As shown in FIG. 20, the back surface of the flange portion 133 of the rubber bushing 110, i.e., the second engaging faces 134 serving as the superposed face, is constituted as an axial-perpendicular face corresponding to the second engaging face 122 of the mounting member 112.

As is understood from FIG. 22, the first engaged face 142 which comprises the stepped face formed when the rubber bushing 110 is press fit into the mounting member 112, is a sloping face corresponding to the first engaging face 120 formed on the inner surface of the mounting member 112, i.e., the sloping face inclined by an angle $\theta$ relative to the axial-perpendicular direction as shown in FIG. 19. Thus, the third engaged face 136 is formed over the entirety of the first engaged face 142. The third engaged face 136 of the outer sleeve 128 and the third engaging face 124 of the mounting member 112 are mutually engaged with each other in the circumferential direction, thus making it possible to prevent rotation of the rubber bushing 110 relative to the mounting member 112.

In the third embodiment, the third engaging face 124 and the third engaged face 136 are formed respectively over the entirety of the second engaging face 122 and the second engaged face 134, whereas in this embodiment the third engaging face 124 and the third engaged face 136 are formed respectively over the entirety of the first engaging face 120 and the first engaged face 142. Except the above, the cylindrical vibration-damping device of this embodiment is similar to the one of the third embodiment.

In the cylindrical vibration damping device of this embodiment as well, the outer sleeve 128, once press fit, can be satisfactorily prevented from dislodging from the mounting member 112 in one axial direction as well as in the other direction opposite this. Since the third engaging portion 148, which engages in the circumferential direction to prevent rotation is formed on the first engaging portion 144, the rubber bushing 110 can also be prevented from displacement in the rotation direction.

Figure 25B:
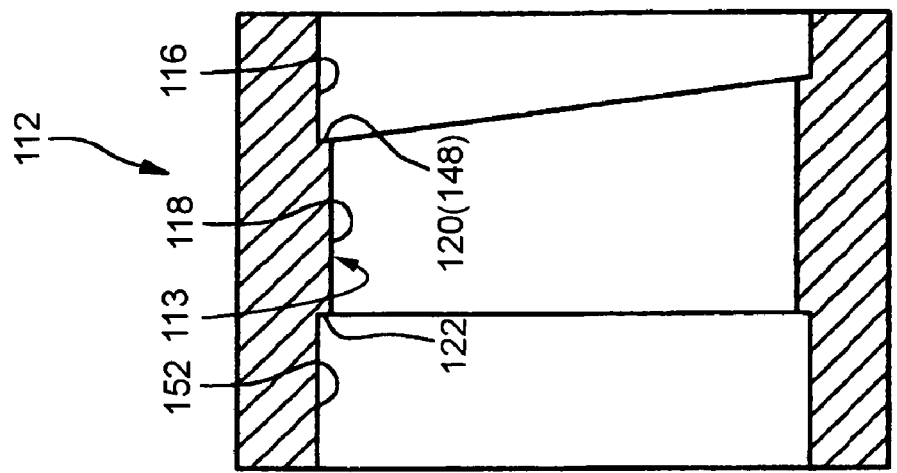
FIG. 25B is an axial cross sectional view of the mounting member of FIG. 25A.
Figure 25A:
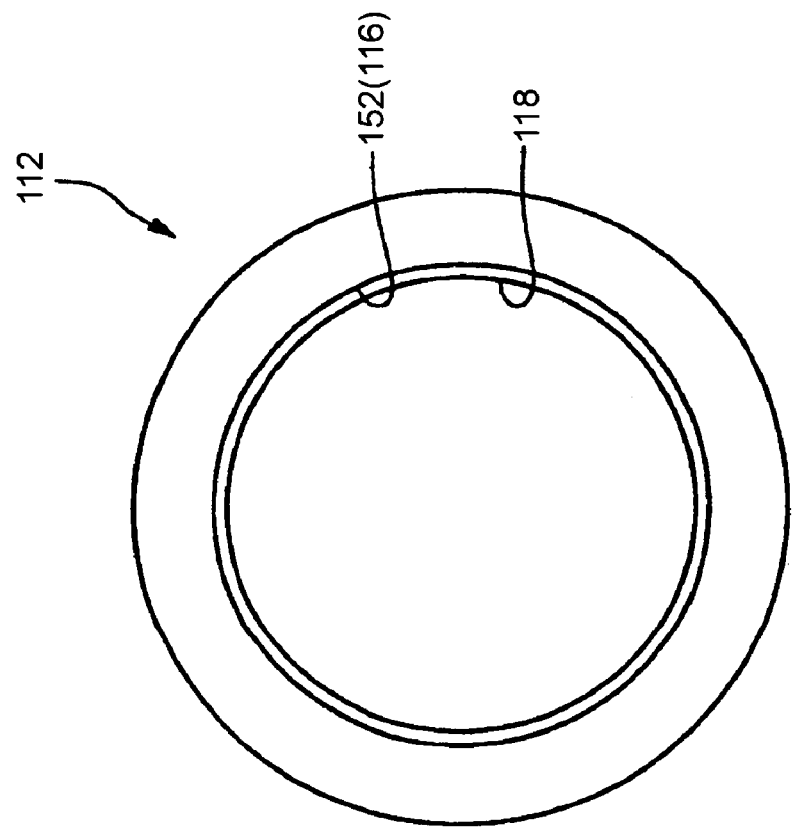
FIG. 25A is a bottom plane view of a mounting member of the cylindrical vibration-damping device of FIG. 23.
Figure 26:
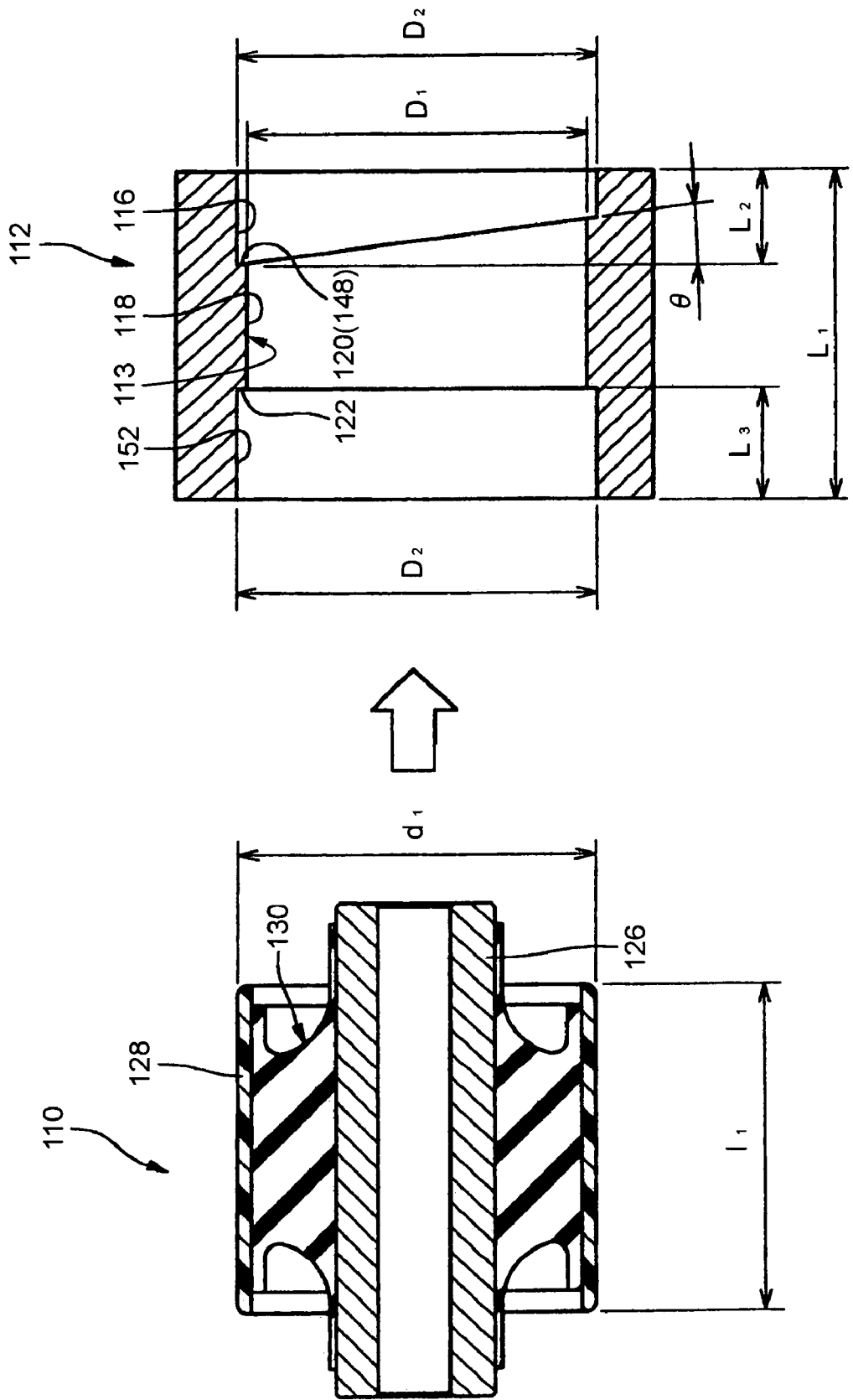
FIG. 26 is a view showing the rubber bushing and the mounting member mutually preset for their assembly, and suitable for recognizing relationships between dimensions of portions of the rubber bushing and the mounting member as well as the direction of press fitting of the rubber bushing into the mounting member.

Referring next to FIGS. 23–26, there is shown a cylindrical vibration-damping device constructed according to a fifth embodiment of the present invention. According to the present embodiment, modifications are made to the cylindrical vibration-damping device according to the fourth embodiment in the following points. Namely, as shown in FIG. 25, a second recessed portion 152 is also formed into the inner surface of the mounting member 112 on one axial end side opposite from the other axial end side where the first recessed portion 116 is provided. Therefore, the stepped face produced between the second recessed portion 152 and the non-recessed portion 118 constitutes the second engaging face 122. This second engaging face 122 is an axis-perpendicular face. On the other hand, the rubber bushing 110 is designed as a flangeless rubber bushing whose outer sleeve 128 does not have a flange portion.

In this embodiment, with the rubber bushing 110 press fit into the mounting member 112 as shown in FIG. 28, the outer sleeve 128 undergoes elastic deformation according to the stepped shape of the inner surface of the mounting member 112, and produces a second large-diameter portion 156 in the portion corresponding to the second recessed portion 152, as shown in FIG. 23. Also, the outer sleeve 128 creates an engaged stepped face at the boundary of this second large-diameter portion 156 and the small-diameter portion 140. In this embodiment, this engaged stepped face constitutes the second engaged face 134. The second engaged face 134 is engaged with the second engaging face 122 in the axial direction, specifically in the rightward direction as seen in FIG. 23.

In this embodiment as well, the rubber bushing 110, once press fit into the mounting member 112, can be prevented from dislodging in one axial direction, and the other direction, as well as simultaneously prevented from displacement in the rotation direction.

Since it is possible to use the rubber bushing 110 devoid of the flange portion 133 at its axial end, the configuration of the rubber bushing 110 in the cylindrical vibration damping device can be simplified, costs required to fabricate the rubber bushing 110 reduced, and the restriction as to directionality when press fitting the rubber bushing 110 into the mounting member 112 eliminated, thereby providing a satisfactory press fit procedure.

While the presently preferred embodiments of the invention have been discussed above for illustrative purpose only, it is to be understood that the invention is not limited to the details of this illustrated embodiment, but may be otherwise embodied. For instance, the third engaging face and the third engaged face may be constituted as stepped faces in the circumferential direction or convex/concave faces in the circumferential direction; or constituted as covered faces, rather than sloping faces.

Figure 27A:
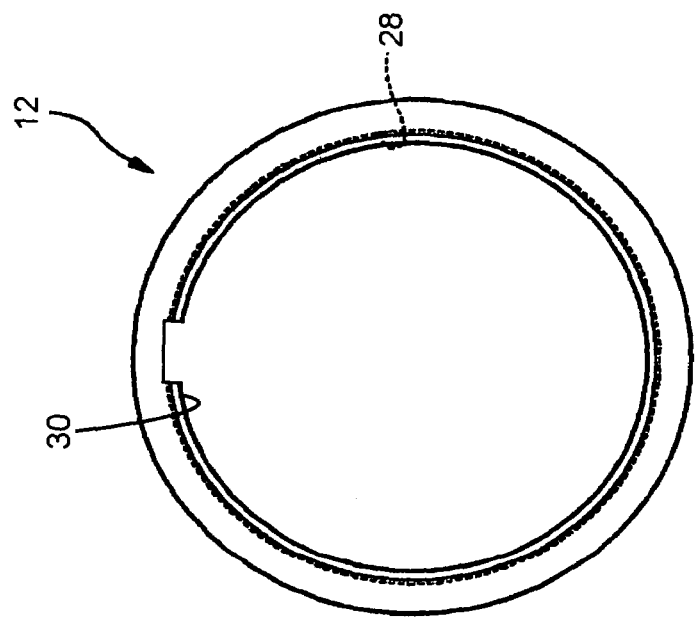
FIG. 27 is an elevational view in axial or vertical cross section of another example of the outer sleeve usable in the vibration-damping device of the present invention.
Figure 27B:
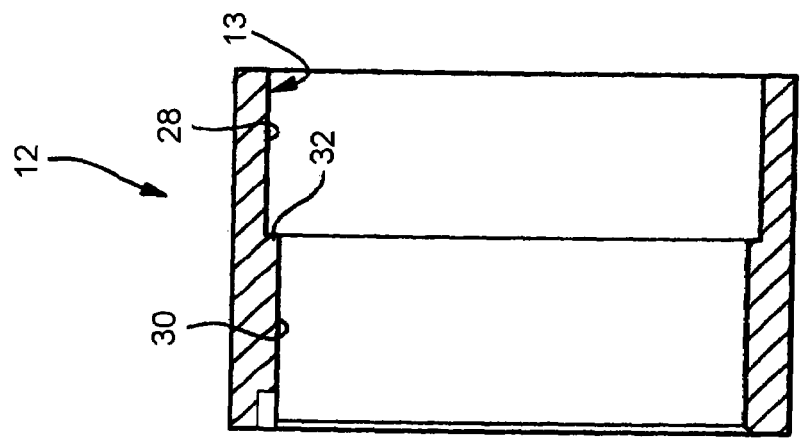

While the anti-rotation engaging and engaged stepped faces have an annular configuration in the illustrated embodiment, the anti-rotation stepped faces may have a variety of configurations. For instance, the anti-rotation engaging stepped faces may have a cutout configuration open in both of the inner circumferential surface and one axial end face of the mounting member 12, with a circumferential length smaller than a circumference of the mounting member 12, as shown in FIGS. 27A and 27B. In this case, the outer surface of the rubber bushing deforms to have a boss formed thereon projecting diametrically outward. Alternatively the outer surface of the rubber bushing has the boss integrally bonded thereon initially. The boss of the outer sleeve is brought into engagement with circumferential opposite end faces of the cutout. That is, the circumferential opposite end faces of the boss of the outer sleeve functions as the anti-rotation engaged faces, while the circumferential opposite end faces of the cutout of the mounting member 12 functions as the anti-rotation engaging stepped faces. Thus, the displacement of the rubber bushing relative to the mounting member can be effectively prevented in the rotation direction.

The present invention is applicable to various kinds of cylindrical vibration damping devices besides cylindrical vibration damping devices employed in automobile torsion beam type rear suspension, and may be modified in various ways without departing from the spirit and scope thereof.

It is also to be understood that the present invention may be embodied with various other changes, modifications and improvements, which may occur to those skilled in the art, without departing from the spirit and scope of the invention defined in the following claims.

What is claimed is:

1. A method of manufacturing a cylindrical vibration-damping device comprising:

providing a rubber bushing including an inner sleeve, a resin outer sleeve disposed about the inner sleeve, and a rubber elastic body interposed between and bonded by vulcanization to an outer circumferential surface of the inner sleeve and an inner circumferential surface of the resin outer sleeve for elastically connecting the inner and outer sleeves;

providing a metallic mounting member having a cylindrical bore such that at least one engaging stepped face is formed on an inner surface of the mounting member at a boundary between a recessed portion and a non-recessed portion thereof;

wherein the resin outer sleeve has a smooth outer circumferential surface and arranging the smooth outer circumferential surface to be at least at a location such that an outside diameter of the resin outer sleeve is engaged with the engaging stepped face of the mounting member, and the smooth outer surface at the location to be engaged with the engaging stepped face has the outside diameter which is larger than an inside diameter of the non-recessed portion and approximately equal to an inside diameter of the recessed portion, and press-fitting with the rubber bushing into the bore of the mounting member so that one portion of the outer sleeve situated facing the non-recessed portion of the mounting member is compressed in diameter, while another portion of the outer sleeve situated facing the recessed portion of the mounting member expands in diameter by means of elastic recovery force in order to enter the recessed portion, whereby the smooth outer circumferential surface of the resin outer sleeve deforms to produce an engaged stepped face thereon, which is brought into engagement with the engaging stepped face on the mounting member in an axial direction so as to exhibit a resistance to dislodging of the rubber bushing from the mounting member.

2. A method of manufacturing a cylindrical vibration-damping device according to claim 1, wherein the at least one engaging stepped face comprises a plurality of engaging stepped faces, further comprising the step of arranging the plurality of engaging stepped faces at respective axial positions spaced away from one another in the axial direction.

3. A method of manufacturing a cylindrical vibration-damping device according to claim 2 wherein said plurality of engaging stepped faces includes a pair of engaging stepped faces facing mutually opposite axial directions, wherein an axial distance between the pair of engaging stepped faces varies in a circumferential direction.

4. A method of manufacturing a cylindrical vibration-damping device according to claim 1, further comprising the step of arranging the resin outer sleeve to have a flange portion at one of opposite axial end thereof, wherein in the step of press fitting the rubber bushing into the bore, the flange portion being brought into abutting contact with a corresponding axial end face of the mounting member so that the flange portion of the resin outer sleeve and the engaging stepped face formed on the outer circumferential surface of the resin outer sleeve face mutually opposite axial directions.

5. A method of manufacturing a cylindrical vibration-damping device according to claim 4, wherein the at least one engaging stepped face of the mounting member is spaced apart from the flange portion in the axial direction, and an axial distance between the engaging stepped face and the flange portion varies in a circumferential direction.

6. A method of manufacturing a cylindrical vibration-damping device according to claim 1, further comprising: arranging an engaging anti-rotation stepped face formed on the inner surface of the mounting member so as to be inclined by a given angle relative to a diametric direction perpendicular to the axial direction; wherein in the step of press fitting the rubber bushing into the bore, an engaged anti-rotation stepped face produced on the outer circumferential surface of the resin outer sleeve once the outer sleeve is press fit into the cylindrical bore of the mounting member, by means of elastic deformation of the outer sleeve, the engaged ant-rotation stepped face being brought into engagement wit the engaging anti-rotation stepped face so as to exhibit a resistance to rotation of the rubber bushing relative to the mounting member in a circumferential direction of the cylindrical bore of the mounting member.

7. A method of manufacturing a cylindrical vibration-damping device according to claim 6, further comprising the step of arranging the engaging stepped face to be inclined by a given angle with respect to the diametric direction so that the engaging stepped face serves as the engaging anti-rotation stepped face as well as the engaging stepped face.

8. A method of manufacturing a cylindrical vibration-damping device according to claim 1, further comprising the step of arranging the at least one engaging stepped face so as to extend in a circumferential direction over an entire circumference of the cylindrical bore of the mounting member so as to be formed as an annular engaging stepped face.

9. A method of manufacturing a cylindrical vibration-damping device according to claim 1, further comprising the step of arranging the mounting member to be composed of a plurality of segments each having a cylindrical bore, and to produce the recessed portion by using one of the plurality of segments whose bore has a greatest inside diameter.

10. A method of manufacturing a cylindrical vibration-damping device including a rubber bushing including an inner sleeve, a resin outer sleeve disposed about the inner sleeve, and a rubber elastic body interposed between and bonded by vulcanization to an outer circumferential surface of the inner sleeve and an inner circumferential surface of the resin outer sleeve for elastically connecting the inner and outer sleeves; a metallic mounting member having a cylindrical bore into which the rubber bushing is press fit; and at least one engaging stepped face previously formed on an inner surface of the mounting member at a boundary between a recessed portion and a non-recessed portion thereof, the resin outer sleeve having a smooth outer surface at least at a location to be engaged with the engaging stepped face of the mounting member before it is being press fit into the bore of the mounting member, and the smooth outer surface at the location to be engaged with the engaging stepped face has an outside diameter larger than an inside diameter of the non-recessed portion and approximately equal to an inside diameter of the recessed portion, said method comprising the steps of:

press fitting the rubber bushing into the bore of the mounting member so tat one portion of the outer sleeve situated facing the non-recessed portion of the mounting member is compressed in diameter, while a first portion of the outer sleeve situated facing the recessed portion of the mounting member expands in diameter by means of elastic recovery force in order to enter the recessed portion, so that the smooth outer surface of the outer sleeve deforms to produce an engaged stepped face thereon; and bringing into engagement the engaged stepped face opposed to the engaging stepped face in an axial direction of the device with the engaging stepped face so as to exhibit a resistance to dislodging of the rubber bushing from the mounting member in at least one of opposite axial directions.

\* \* \* \* \*